(12) United States Patent
Johnson et al.

(10) Patent No.: US 10,747,565 B2
(45) Date of Patent: Aug. 18, 2020

(54) VIRTUALIZATION OF CONTROL AND STATUS SIGNALS

(71) Applicant: Amazon Technologies, Inc., Seattle, WA (US)

(72) Inventors: Robert Michael Johnson, Austin, TX (US); Kiran Kalkunte Seshadri, Cedar Park, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 15/717,196

(22) Filed: Sep. 27, 2017

(65) Prior Publication Data

US 2018/0300165 A1    Oct. 18, 2018

Related U.S. Application Data

(60) Provisional application No. 62/486,921, filed on Apr. 18, 2017.

(51) Int. Cl.
| | |
|---|---|
| *G06F 9/455* | (2018.01) |
| *H04L 29/08* | (2006.01) |
| *G06F 9/50* | (2006.01) |

(52) U.S. Cl.
CPC ........ *G06F 9/45558* (2013.01); *G06F 9/5077* (2013.01); *H04L 67/16* (2013.01); *H04L 67/34* (2013.01); *G06F 2009/45579* (2013.01); *G06F 2009/45583* (2013.01); *G06F 2009/45595* (2013.01); *H04L 67/1097* (2013.01)

(58) Field of Classification Search
CPC .................................................. G06F 9/45533

USPC ............................................................ 718/1
See application file for complete search history.

(56) References Cited

U.S. PATENT DOCUMENTS

| | | | |
|---|---|---|---|
| 9,766,910 B1* | 9/2017 | Berg ........................ G06F 9/455 |
| 2004/0095237 A1* | 5/2004 | Chen ................... G06F 11/0748 |
| | | | 340/506 |

(Continued)

OTHER PUBLICATIONS

Chen : "Enabling FPGAs in the cloud", Computing Frontiers, ACM, 2 Penn Plaza, Suite 701 New York NY 10121-0701 USA, (Year: 2014).*

(Continued)

*Primary Examiner* — Mehran Kamran
(74) *Attorney, Agent, or Firm* — Kilpatrick Townsend & Stockton LLP

(57) ABSTRACT

A computing system can include a server computer and a configurable hardware platform. The server computer can include instances or domains such as a management partition and a user partition. The management partition can be used to perform management services for the user partitions and the configurable hardware platform. The configurable hardware platform is coupled to the server computer, and can include a host logic and a configurable application logic. In an embodiment, the computing system is configured to provide the user partition with physical or virtual access to a first part of the configurable hardware platform through the host logic in the configurable hardware platform. The computing system is also configured to provide the user partition with virtual access to certain portions/resources associated with the configurable hardware platform.

16 Claims, 9 Drawing Sheets

(56) References Cited

U.S. PATENT DOCUMENTS

| | | | | |
|---|---|---|---|---|
| 2004/0123297 | A1* | 6/2004 | Flautner | G06F 1/3203 718/102 |
| 2005/0030898 | A1* | 2/2005 | Furlong | H04L 41/00 370/236 |
| 2009/0006074 | A1* | 1/2009 | Green | G06F 9/45504 703/28 |
| 2011/0309947 | A1* | 12/2011 | Zhang | G06F 3/04817 340/691.8 |
| 2012/0102138 | A1* | 4/2012 | Chan | G06F 12/0862 709/213 |
| 2012/0227045 | A1* | 9/2012 | Knauth | G06F 9/3863 718/100 |
| 2012/0272015 | A1* | 10/2012 | Fahrig | G06F 9/45533 711/153 |
| 2013/0024589 | A1* | 1/2013 | Yamauchi | G06F 13/24 710/263 |
| 2013/0031390 | A1* | 1/2013 | Smith, III | G06F 1/206 713/320 |
| 2014/0215424 | A1* | 7/2014 | Fine | G06F 17/5054 716/117 |
| 2014/0259149 | A1* | 9/2014 | Circello | G06F 21/74 726/16 |
| 2015/0169376 | A1* | 6/2015 | Chang | G06F 9/48 718/104 |
| 2015/0227284 | A1* | 8/2015 | Tehranchi | G05B 23/0216 715/835 |
| 2016/0094413 | A1* | 3/2016 | Jain | H04L 41/5019 709/226 |
| 2016/0321113 | A1* | 11/2016 | Pinto | G06F 9/45533 |
| 2017/0039089 | A1* | 2/2017 | Xia | G06F 9/4555 |
| 2017/0153854 | A1* | 6/2017 | Zheng | G06F 3/0613 |
| 2017/0195173 | A1* | 7/2017 | Izenberg | G06F 9/45558 |
| 2017/0315815 | A1* | 11/2017 | Smith | G06F 9/3017 |
| 2017/0337073 | A1* | 11/2017 | Tsirkin | G06F 9/45558 |
| 2018/0034938 | A1* | 2/2018 | Huang | H04L 67/141 |
| 2018/0088992 | A1* | 3/2018 | Davis | G06F 9/5077 |
| 2018/0139110 | A1* | 5/2018 | Johnson | H04L 41/5054 |
| 2018/0196951 | A1* | 7/2018 | Hoppert | G06F 21/604 |
| 2018/0203713 | A1* | 7/2018 | Elfering | G06F 9/4411 |
| 2018/0205553 | A1* | 7/2018 | Hoppert | H04L 9/3247 |
| 2018/0260257 | A1* | 9/2018 | Okada | G06F 9/468 |

OTHER PUBLICATIONS

Bobda et al., "Hardware Sandboxing: A Novel Defense Paradigm Against Hardware Trojans in Systems on Chip", Medical Image Computing and Computer-Assisted Intervention, Mar. 31, 2017, pp. 47-59.

Byma et al., "FPGAs in the Cloud: Booting Virtualized Hardware Accelerators with Openstack", 2014 IEEE 22nd Annual International Symposium on Field-Programmable Custom Computing Machines, IEEE, May 11, 2014, pp. 109-116.

Chen et al., "Enabling FPGAs in the Cloud", Computing Frontiers, ACM, May 20, 2014, pp. 1-10.

PCT/US2018/028003, "International Search Report and Written Opinion", dated Jul. 30, 2018, 14 pages.

* cited by examiner

VIRTUALIZATION OF CONTROL AND STATUS SIGNALS

CROSS REFERENCE TO RELATED APPLICATIONS

This application is a non-provisional of and claims priority to U.S. Provisional Application No. 62/486,921, filed Apr. 18, 2017 and titled "VIRTUALIZATION OF CONTROL AND STATUS SIGNALS", the contents of which are herein incorporated in its entirety.

BACKGROUND

Cloud computing techniques can include use of networked computing resources (e.g., hardware and software) of a cloud provider to be made available for use by clients. Clients can access the networked computing resources via a network, such as the internet, to configure the networked computing resources to provide a service or to access a provided service provided by another client. Cloud computing techniques can facilitate more efficient use of networked computing resources by, for example, enabling the resources to be allocated as needed between clients (e.g., for clients to scale services operating on cloud computing resources or to prototype new cloud enabled services) and/or by allocating hardware in a time sliced manner to several clients concurrently.

Clients of cloud services may have diverse computing requirements resulting from different use cases. A cloud service provider can include various different computer systems having different types of components with varying levels of performance and/or functionality. Thus, a client can select a computer system that can potentially be more efficient at executing a particular task. For example, the cloud service provider can provide systems with varying combinations of processing performance, memory performance, storage capacity or performance, and networking capacity or performance. However, some clients may desire to use hardware that is proprietary or highly specialized for executing their computing tasks. Enabling use of client defined hardware within a cloud infrastructure can raise security and/or stability integrity concerns.

BRIEF DESCRIPTION OF THE DRAWINGS

Various embodiments in accordance with the present disclosure will be described with reference to the drawings, in which.

DETAILED DESCRIPTION

Figure 1:
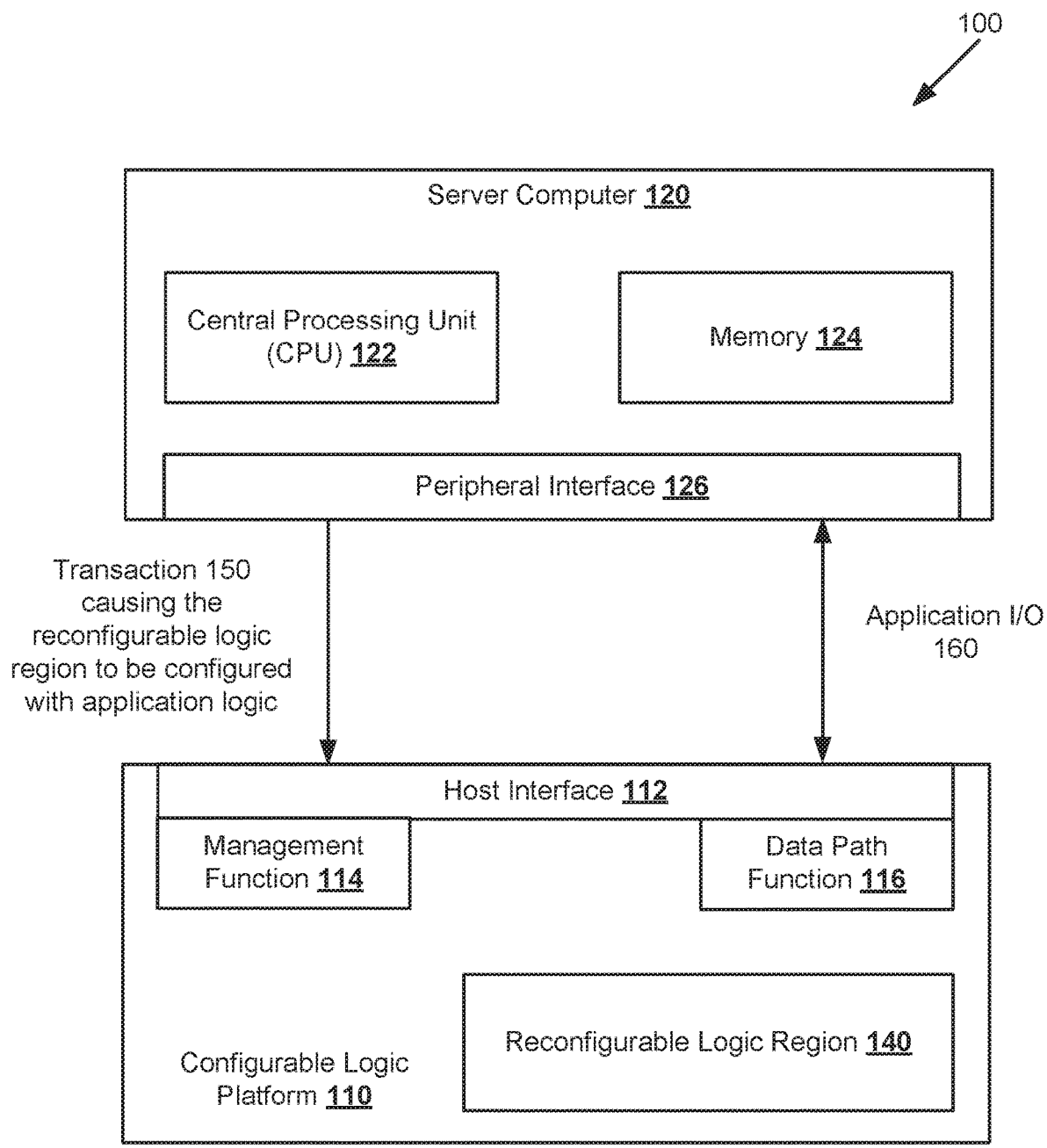
FIG. 1 is a system diagram showing an example of a system including a configurable logic platform.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud service providers can utilize virtualization techniques which can include physically or logically isolating host services to a host domain and client services to one or more client domains. As used herein, a domain is a group of logical computer devices and/or hardware computers and devices on a network that are administered as a unit with common rules and procedures. By isolating a client domain from a host domain, a client may be able to access certain functionality provided by a cloud service and may be restricted from accessing functionality of the host domain. For example, host domain functionality can include management of the cloud infrastructure which, if accessed by a client system, could jeopardize functionality of the cloud system. Furthermore, logical domain separation allows various platforms and services to be abstracted from the underlying hardware, providing flexibility within a cloud infrastructure to service a multitude of varied and differing client requirements and more efficiently assign the underlying hardware and other computer resources between client domains. A certain amount of overhead may be introduced to facilitate logical separation of different domains. This overhead may take the form of reduced performance of client services and/or client access to services. Certain clients may desire to have specialized computing resources (e.g., hardware computing resources) that may enable more efficient processing of certain client functions. Disclosed are techniques that can be used to enable specialized computing resources within a cloud environment while still providing separation, within a cloud infrastructure, between a host domain and a client domain on which the specialized computing resources may reside.

Cloud service providers can provide specialized computing resources within a set of reusable general computing resources by providing a server computer comprising a configurable logic platform (such as by providing a server computer with an add-in card including a field-programmable gate array (FPGA)) as a choice among the general computing resources. Configurable logic is hardware that can be programmed or configured to perform a logic function that is specified by configuration data that is applied to or loaded on the configurable logic. For example, a user of the computing resources can provide a specification (such as source code written in a hardware description language) for configuring the configurable logic, the configurable logic can be configured according to the specification, and the configured logic can be used to perform a task for the user. However, allowing a user access to low-level hardware of the computing facility can potentially introduce security and privacy issues within the computing facility. As a specific example, a faulty or malicious design from one user could potentially cause a denial of service to other users if the configured logic caused one or more server computers within the computing facility to malfunction (e.g., crash, hang, or reboot) or be denied network services. As another specific example, a faulty or malicious design from one user could potentially corrupt or read data from another user if the configured logic is able to read and/or write memory of the other user's memory space.

As described herein, a computer services facility can include a variety of computing resources, where one type of the computing resources can include a server computer comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. As a specific example, the hardware accelerator can be accessible via a local interconnect, such as Peripheral Component Interconnect Express (PCI-Express or PCIe), of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application.

The compute services provider can potentially increase the security and/or availability of the computing resources by wrapping or encapsulating the user's application logic or customer logic (CL), e.g., a hardware accelerator, within host logic (HL) of the configurable logic platform. Encapsulating the application logic can include limiting or restricting the application logic's access to configuration resources, physical interfaces, hard macros of the configurable logic platform, and various peripherals of the configurable logic platform. For example, the compute services provider can manage the programming of the configurable logic platform so that it includes both the host logic and the application logic. The host logic can provide a framework or sandbox for the application logic to work within. In particular, the host logic can communicate with the application logic and constrain the functionality of the application logic. For example, the host logic can perform bridging functions between the local interconnect (e.g., the PCIe interconnect) and the application logic so that the application logic cannot directly control the signaling on the local interconnect. The host logic can be responsible for forming packets or bus transactions on the local interconnect and ensuring that the protocol requirements are met. By controlling transactions on the local interconnect, the host logic can potentially prevent malformed transactions or transactions to out-of-bounds locations. As another example, the host logic can isolate a configuration access port so that the application logic cannot cause the configurable logic platform to be reprogrammed without using services provided by the compute services provider.

In some embodiments of the disclosed technology, virtualization of control and status signals can be utilized to provide another level of protection against security and/or stability integrity concerns in a computing system including a configurable hardware platform (e.g., FPGA). The computing system can include a server computer and a configurable hardware platform. The server computer can include instances or domains such as a management partition (such as Domain 0 of the Xen hypervisor) and a user partition (such as Domain U of the Xen hypervisor). The management partition can be used to perform management services for the user partitions and the configurable hardware platform. The configurable hardware platform is coupled to the server computer, and can include a host logic and a configurable application logic. In an embodiment, the computing system is configured to provide the user partition with physical or virtual access to a first part of the configurable hardware platform through the host logic in the configurable hardware platform. The computing system is also configured to provide the user partition with virtual access to certain portions/resources associated with the configurable hardware platform.

In one embodiment, virtual access may refer to access from the user partition wherein the user partition perceives the access to be directed to a hardware resource in the configurable hardware platform. Instead, the access is rerouted (e.g., using a mailbox logic by the host/shell logic) to the management partition for further processing. The management partition may perform (or actuate such a performance) the access to the configurable hardware platform on behalf of the user partition. In this manner, the virtual access may be configured to allow the user access to control and status signals of the configurable hardware platform from within the instance of user partition, while continuing to protect the configurable hardware platform from malicious and/or errant uses.

In some embodiments of the disclosed technology, a method for virtualization of control or status signals in a computing system is provided. The computing system can have a server computer and a configurable hardware platform. The server computer can include a management partition and a user partition, and the configurable hardware platform can include a host logic and a configurable application logic. The method includes the configurable hardware platform receiving, from the user partition, a first command to request for a first status or control signal in the configurable hardware platform. The first command is forwarded to the management partition in the server computer for processing. In some embodiments, a virtual register holding the value for the first status or control signal resides in the management partition. The configurable hardware platform receives the first value representing the status or control signal from the management partition. Next, the configurable hardware platform provides the requested value to the user partition in the server computer.

In some embodiments, the virtual register holding the value for the status or control signal can reside in the configurable hardware platform. In this case, the configurable hardware platform receives a second command from the user partition to request for a second status or control signal in the configurable hardware platform. The configurable hardware platform processes the second command, and determines a value in the virtual register in the configurable hardware platform. Next, the configurable hardware platform returns to the user partition the second value representing a second status or control signal in the configurable hardware platform.

Depending on the embodiment, the virtual register in the configurable hardware platform can reside in the host logic or in the configurable application logic of the configurable hardware platform. Further, the virtual register can hold values derived from a corresponding physical register, such as counters, status, metrics registers, etc. Alternatively, the virtual register can hold values for a virtual device, such as a virtual light-emitting diode (LED) or a virtual dual in-line (DIP) switch.

FIG. 1 is a system diagram showing an example of a computing system 100 including a configurable logic platform 110 and a server computer 120. For example, the server computer 120 can be used to execute an application program for an end-user. Specifically, the server computer 120 can include a central processing unit (CPU) 122, a memory 124, and a peripheral interface 126. The CPU 122 can be used to execute instructions stored in the memory 124. For example, the memory 124 can be loaded with all or a portion of the application program and the CPU 122 can execute the instructions of the application program. The application program can communicate with a hardware accelerator of the configurable logic platform 110 by issuing transactions using the peripheral interface 126.

As used herein, a transaction is a communication between components. As specific examples, a transaction can be a read request, a write, a read response, a message, an interrupt, or other various exchanges of information between components. The transaction can occur on a bus shared by multiple components. Specifically, values of signal lines of the bus can be modulated to transfer information on the bus using a communications protocol of the bus. The transaction can occur over one or more phases, such as an address phase and one or more data phases. Additionally or alternatively, the transaction can occur using one or more serial lines of a point-to-point interconnect that connects two components. Specifically, the transaction can be sent in a packet that is transmitted over the point-to-point interconnect.

The peripheral interface 126 can include a bridge for communicating between the CPU 122 using a local or front-side interconnect and components using a peripheral or expansion interconnect. Specifically, the peripheral interface 126 can be connected to a physical interconnect that is used to connect the server computer 120 to the configurable logic platform 110 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the server computer 120 to the configurable logic platform 110. Thus, the server computer 120 and the configurable logic platform 110 can communicate using PCI bus transactions or PCIe packets, for example.

The configurable logic platform 110 can include a host logic and a reconfigurable logic region 140. The host logic (HL), also referred to as shell, can include a host interface 112, a management function 114, and a data path function 116. The reconfigurable logic region 140, also referred to as customer logic (CL), can include hardware that is configurable to implement the hardware accelerator or application logic. In other words, the reconfigurable logic region 140 can include logic that is programmable to perform a given function. For example, the reconfigurable logic region 140 can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. etc.

The host logic can be used to encapsulate the reconfigurable logic region 140. For example, the reconfigurable logic region 140 can interface with various components of the configurable hardware platform using predefined interfaces so that the reconfigurable logic region 140 is restricted in the functionality that it can perform. As one example, the reconfigurable logic region can interface with static host logic that is loaded prior to the reconfigurable logic region 140 being configured. For example, the static host logic can include logic that isolates different components of the configurable logic platform 110 from the reconfigurable logic region 140. As one example, hard macros of the configurable logic platform 110 (such as a configuration access port or circuits for signaling on the physical interconnect) can be masked off so that the reconfigurable logic region 140 cannot directly access the hard macros.

The host logic can include the host interface 112 for communicating with the server computer 120. Specifically, the host interface 112 can be used to connect to the physical interconnect and to communicate with the server computer 120 using a communication protocol of the physical interconnect. As one example, the server computer 120 can communicate with the configurable logic platform 110 using a transaction including an address associated with the configurable logic platform 110. Similarly, the configurable logic platform 110 can communicate with the server computer 120 using a transaction including an address associated with the server computer 120. The addresses associated with the various devices connected to the physical interconnect can be predefined by a system architect and programmed into software residing on the devices. Additionally or alternatively, the communication protocol can include an enumeration sequence where the devices connected to the physical interconnect are queried and where addresses are assigned to each of devices as part of the enumeration sequence. As one example, the peripheral interface 126 can issue queries to each of the devices connected to the physical interconnect. The host interface 112 can respond to the queries by providing information about the configurable logic platform 110, such as how many functions are present on the configurable logic platform 110, and a size of an address range associated with each of the functions of the configurable logic platform 110. Based on this information, addresses of the computing system 100 can be allocated such that each function of each device connected to the physical interconnect is assigned a non-overlapping range of addresses. After enumeration, the host interface 112 can route transactions to functions of the configurable logic platform 110 based on an address of the transaction.

The host logic can include the management function 114 that can be used for managing and configuring the configurable logic platform 110. Commands and data can be sent from the server computer 120 to the management function 114 using transactions that target the address range of the management function 114. For example, the server computer 120 can generate transactions to transfer data (e.g., configuration data) and/or write control registers of the configurable logic platform 110 that are mapped to one or more addresses within the address range of the management function 114. Writing the control registers can cause the configurable logic platform 110 to perform operations, such as configuring and managing the configurable logic platform 110. As a specific example, configuration data corresponding to application logic to be implemented in the reconfigurable logic region 140 can be transmitted from the server computer 120 to the configurable logic platform 110 in one or more transactions over the physical interconnect. A transaction 150 to configure the reconfigurable logic region 140 with the configuration data can be transmitted from the server computer 120 to the configurable logic platform 110. Specifically, the transaction 150 can write a value to a control register mapped to the management function 114 address space that will begin configuring the reconfigurable logic region 140. In one embodiment, the configuration data can be transferred from the server computer 120 to the configurable logic platform 110 before the configuration of the reconfigurable logic region 140 begins. For example, the management function 114 can cause the configuration data to be stored in an on-chip or off-chip memory accessible by the configurable logic platform 110, and the configuration data can be read from the memory when the reconfigurable logic region 140 is being configured. In another embodiment, the configuration data can be transferred from the server computer 120 to the configurable logic platform 110 after the configuration of the reconfigurable logic region 140 begins. For example, a control register can be written to begin configuration of the reconfigurable logic region 140 and the configuration data can be streamed into or loaded onto the reconfigurable logic region 140 as transactions including the configuration data are processed by the management function 114.

The host logic can include a data path function 116 that can be used to exchange information (e.g., application input/output 160) between the server computer 120 and the configurable logic platform 110. Specifically, commands and data can be sent from the server computer 120 to the data path function 116 using transactions that target the address range of the data path function 116. Similarly, the configurable logic platform 110 can communicate with the server computer 120 using a transaction including an address associated with the server computer 120. The data path function 116 can act as a translation layer between the host interface 112 and the reconfigurable logic region 140. Specifically, the data path function 116 can include an interface for receiving information from the reconfigurable logic region 140 and the data path function 116 can format the information for transmission from the host interface 112. Formatting the information can include generating control information for one or more transactions and partitioning data into blocks that are sized to meet protocol specifications. Thus, the data path function 116 can be interposed between the reconfigurable logic region 140 and the physical interconnect. In this manner, the reconfigurable logic region 140 can potentially be blocked from formatting transactions and directly controlling the signals used to drive the physical interconnect so that the reconfigurable logic region 140 cannot be used to inadvertently or maliciously violate protocols of the physical interconnect.

Figure 2:
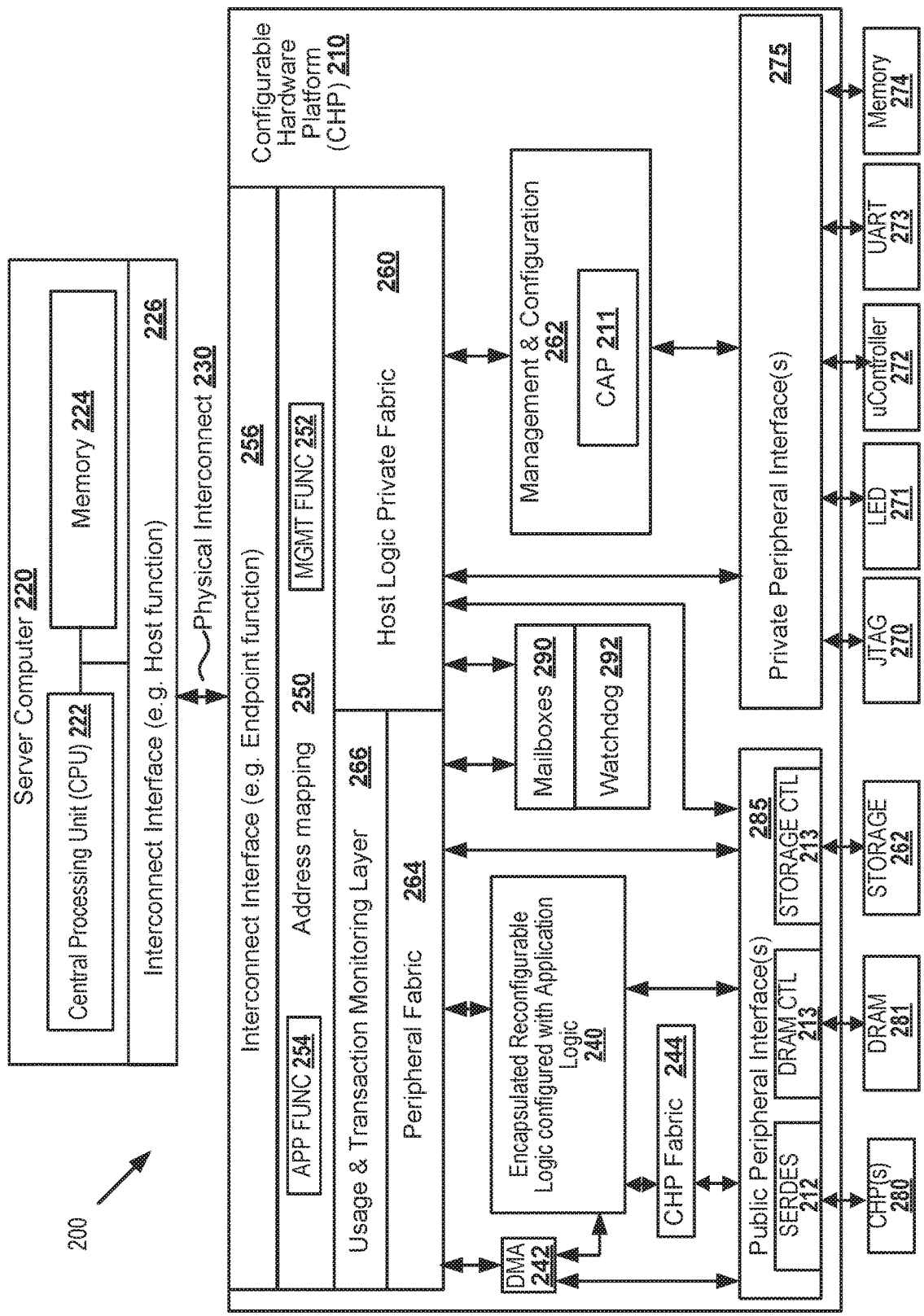
FIG. 2 is a system diagram showing another example of a system including a configurable logic platform.

FIG. 2 is a system diagram showing an example of a system 200 including a configurable hardware platform 210 and a server computer 220. The server computer 220 and the configurable hardware platform 210 can be connected via a physical interconnect 230. For example, the physical interconnect 230 can be PCI express, PCI, or any other interconnect that tightly couples the server computer 220 to the configurable hardware platform 210. The server computer 220 can include a CPU 222, memory 224, and an interconnect interface 226. For example, the interconnect interface 226 can provide bridging capability so that the server computer 220 can access devices that are external to the server computer 220. For example, the interconnect interface 226 can include a host function, such as root complex functionality as used in PCI express.

The configurable hardware platform 210 can include reconfigurable logic blocks and other hardware. The reconfigurable logic blocks can be configured or programmed to perform various functions of the configurable hardware platform 210. The reconfigurable logic blocks can be programmed multiple times with different configurations so that the blocks can perform different functions over the lifetime of the device. The functions of the configurable hardware platform 210 can be categorized based upon the purpose or capabilities of each function, or based upon when the function is loaded into the configurable hardware platform 210. For example, the configurable hardware platform 210 can include static logic, reconfigurable logic, and hard macros. The functionality for the static logic, reconfigurable logic, and hard macros can be configured at different times. Thus, the functionality of the configurable hardware platform 210 can be loaded incrementally.

A hard macro can perform a predefined function and can be available when the configurable hardware platform 210 is powered on. For example, a hard macro can include hard-wired circuits that perform a specific function. As specific examples, the hard macros can include a configuration access port (CAP) 211 for configuring the configurable hardware platform 210, a serializer-deserializer transceiver (SERDES) 212 for communicating serial data, a memory or dynamic random access memory (DRAM) controller 213 for signaling and controlling off-chip memory (such as a double data rate (DDR) DRAM 281), and a storage controller 214 for signaling and controlling a storage device 282.

The static logic can be loaded at boot time onto reconfigurable logic blocks. For example, configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and deasserting a reset signal in response to the power event. An initialization sequence can be triggered in response to the power event or the reset being deasserted. The initialization sequence can include reading configuration data stored on the flash device and loading the configuration data onto the configurable hardware platform 210 using the configuration access port 211 so that at least a portion of the reconfigurable logic blocks are programmed with the functionality of the static logic. After the static logic is loaded, the configurable hardware platform 210 can transition from a loading state to an operational state that includes the functionality of the static logic.

The reconfigurable logic can be loaded onto reconfigurable logic blocks while the configurable hardware platform 210 is operational (e.g., after the static logic has been loaded). The configuration data corresponding to the reconfigurable logic can be stored in an on-chip or off-chip memory and/or the configuration data can be received or streamed from an interface (e.g., the interconnect interface 256) of the configurable hardware platform 210. The reconfigurable logic can be divided into non-overlapping regions, which can interface with static logic. For example, the reconfigurable regions can be arranged in an array or other regular or semi-regular structure. For example, the array structure may include holes or blockages where hard macros are placed within the array structure. The different reconfigurable regions can communicate with each other, the static logic, and the hard macros by using signal lines that can be specified as static logic. The different reconfigurable regions can be configured at different points in time so that a first reconfigurable region can be configured at a first point in time and a second reconfigurable region can be configured at a second point in time.

The functions of the configurable hardware platform 210 can be divided or categorized based upon the purpose or capabilities of the functions. For example, the functions can be categorized as control plane functions, data plane functions, and shared functions. A control plane can be used for management and configuration of the configurable hardware platform 210. The data plane can be used to manage data transfer between accelerator logic loaded onto the configurable hardware platform 210 and the server computer 220. Shared functions can be used by both the control plane and the data plane. The control plane functionality can be loaded onto the configurable hardware platform 210 prior to loading the data plane functionality. The data plane can include encapsulated reconfigurable logic configured with application logic 240. The control plane can include host logic of the configurable hardware platform 210.

Generally, the data plane and the control plane can be accessed using different functions of the configurable hardware platform 210, where the different functions are assigned to different address ranges. Specifically, the control plane functions can be accessed using a management function 252 and the data plane functions can be accessed using a data path function or an application function 254. An address mapping layer 250 can differentiate transactions bound for the control plane or the data plane. In particular, transactions from the server computer 220 bound for the configurable hardware platform 210 can be identified using an address within the transaction. Specifically, if the address of the transaction falls within the range of addresses assigned to the configurable hardware platform 210, the transaction is destined for the configurable hardware platform 210. The transaction can be sent over the physical interconnect 230 and received at the interconnect interface 256. The interconnect interface 256 can be an endpoint of the physical interconnect 230. It should be understood that the physical interconnect 230 can include additional devices (e.g., switches and bridges) arranged in a fabric for connecting devices or components to the server computer 220.

The address mapping layer 250 can analyze the address of the transaction and determine where to route the transaction within the configurable hardware platform 210 based on the address. For example, the management function 252 can be assigned a first range of addresses and different functions of the management plane can be accessed by using different addresses within that range. Transactions with addresses falling within the range assigned to the management function 252 can be routed through the host logic private fabric 260 to the different blocks of the control plane. For example, transactions can be addressed to a management and configuration block 262. Similarly, the application function 254 can be assigned a second range of addresses and different functions of the data plane can be accessed by using different addresses within that range.

The management and configuration block 262 can include functions related to managing and configuring the configurable hardware platform 210. For example, the management and configuration block 262 can provide access to the configuration access port 211 so that the reconfigurable logic blocks can be configured. For example, the server computer 220 can send a transaction to the management and configuration block 262 to initiate loading of the application logic within the encapsulated reconfigurable logic 240. The configuration data corresponding to the application logic can be sent from the server computer 220 to the management function 252. The management function 252 can route the configuration data corresponding to the application logic through the host logic fabric 260 to the configuration access port 211 so that the application logic can be loaded.

As another example, the management and configuration block 262 can store metadata about the configurable hardware platform 210. For example, versions of the different logic blocks, update histories, and other information can be stored in memory of the management and configuration block 262. The server computer 220 can read the memory to retrieve some or all of the metadata. Specifically, the server computer 220 can send a read request targeting the memory of the management and configuration block 262 and the management and configuration block 262 can generate read response data to return to the server computer 220.

The management function 252 can also be used to access private peripherals of the configurable hardware platform 210. The private peripherals are components that are only accessible from the control plane. For example, the private peripherals can include a JTAG (e.g., IEEE 1149.1) controller 270, light emitting displays (LEDs) 271, a microcontroller 272, a universal asynchronous receiver/transmitter (UART) 273, a memory 274 (e.g., a serial peripheral interface (SPI) flash memory), and any other components that are accessible from the control plane and not the data plane. The management function 252 can access the private peripherals by routing commands through the host logic private fabric 260 and the private peripheral interface(s) 275. The private peripheral interface(s) 275 can directly communicate with the private peripherals.

Public peripherals are shared functions that are accessible from either the control plane or the data plane. For example, the public peripherals can be accessed from the control plane by addressing transactions within the address range assigned to the management function 252. The public peripherals can be accessed from the data plane by addressing transactions within the address range assigned to the application function 254. Thus, the public peripherals are components that can have multiple address mappings and can be used by both the control plane and the data plane. Examples of the public peripherals are other configurable hardware platform(s) (CHP(s)) 280, DRAM 281 (e.g., DDR DRAM), storage devices 282 (e.g., hard disk drives and solid-state drives), and other various components that can be used to generate, store, or process information. The public peripherals can be accessed via the public peripheral interfaces 285. Thus, the public peripheral interfaces 285 can be an intermediary layer transposed between the public peripherals and the other functions of the configurable hardware platform 210. Specifically, the public peripheral interfaces 285 can translate requests from the control plane or the data plane and format communications to the public peripherals into a native protocol of the public peripherals.

Mailboxes 290 and watchdog timers 292 are shared functions that are accessible from either the control plane or the data plane. Specifically, the mailboxes 290 can be used to pass messages and other information between the control plane and the data plane. For example, the mailboxes 290 can include buffers, control registers (such as semaphores), and status registers. By using the mailboxes 290 as an intermediary between the control plane and the data plane, isolation between the data plane and the control plane can potentially be increased which can increase the security of the configurable hardware platform 210.

The watchdog timers 292 can be used to detect and recover from hardware and/or software malfunctions. For example, a watchdog timer 292 can monitor an amount of time taken to perform a particular task, and if the amount of time exceeds a threshold, the watchdog timer 292 can initiate an event, such as writing a value to a control register or causing an interrupt or reset to be asserted. As one example, the watchdog timer 292 can be initialized with a first value when beginning a first task. The watchdog timer 292 can automatically count down after it is initialized and if the watchdog timer 292 reaches a zero value, an event can be generated. Alternatively, if the first task finishes before the watchdog timer 292 reaches a zero value, the watchdog timer 292 can be reinitialized with a second value when beginning a second task. The first and second values can be selected based on a complexity or an amount of work to complete in the first and second tasks, respectively.

The application function 254 can be used to access the data plane functions, such as the application logic 240. For example, a transaction directed to the application logic 240 can cause data to be loaded, processed, and/or returned to the server computer 220. Specifically, the data plane functions can be accessed using transactions having an address within the range assigned to the application function 254. For example, a transaction can be sent from the server computer 220 to the application logic 240 via the application function 254. Specifically, transactions addressed to the application function 254 can be routed through the peripheral fabric 264 to the application logic 240. Responses from the application logic 240 can be routed through the peripheral fabric 264 to the application function 254, and then back to the server computer 220. Additionally, the data and transactions generated by the application logic 240 can be monitored using a usage and transaction monitoring layer 266. The monitoring layer 266 can potentially identify transactions or data that violate predefined rules and can generate an alert to be sent over the control plane. Additionally or alternatively, the monitoring layer 266 can terminate any transactions generated by the application logic 240 that violate any criteria of the monitoring layer 266. Additionally, the monitoring layer 266 can analyze information moving to or from the application logic 240 so that statistics about the information can be collected and accessed from the control plane.

Data can also be transferred between the server computer 220 and the application logic by programming a direct memory access (DMA) engine 242. The DMA engine 242 can include control and status registers for programming or specifying DMA transfers from a source location to a destination location. As one example, the DMA engine 242 can be programmed to pull information stored within the memory 224 of server computer 220 into the application logic 240 or into the public peripherals of the configurable hardware platform 210. As another example, the DMA engine 242 can be programmed to push data that has been generated by the application logic 240 to the memory 224 of the server computer 220. The data generated by the application logic 240 can be streamed from the application logic 240 or can be written to the public peripherals, such as the memory 281 or storage 282.

The application logic 240 can communicate with other configurable hardware platforms 280. For example, the other configurable hardware platforms 280 can be connected by one or more serial lines that are in communication with the SERDES 212. The application logic 240 can generate transactions to the different configurable hardware platforms 280, and the transactions can be routed through the CHP fabric 244 to the corresponding serial lines (via the SERDES 212) of the configurable hardware platforms 280. Similarly, the application logic 240 can receive information from other configurable hardware platforms 280 using the reverse path.

In sum, the functions of the configurable hardware platform 210 can be categorized as control plane functions and application functions. The control plane functions can be used to monitor and restrict the capabilities of the data plane. The data plane functions can be used to accelerate a user's application that is running on the server computer 220. By separating the functions of the control and data planes, the security and availability of the server computer 220 and other computing infrastructure can potentially be increased. For example, the application logic 240 cannot directly signal onto the physical interconnect 230 because the intermediary layers of the control plane control the formatting and signaling of transactions of the physical interconnect 230. As another example, the application logic 240 can be prevented from using the private peripherals which could be used to reconfigure the configurable hardware platform 210 and/or to access management information that may be privileged. As another example, the application logic 240 can only access hard macros of the configurable hardware platform 210 through intermediary layers so that any interaction between the application logic 240 and the hard macros is controlled using the intermediary layers.

Figure 3:
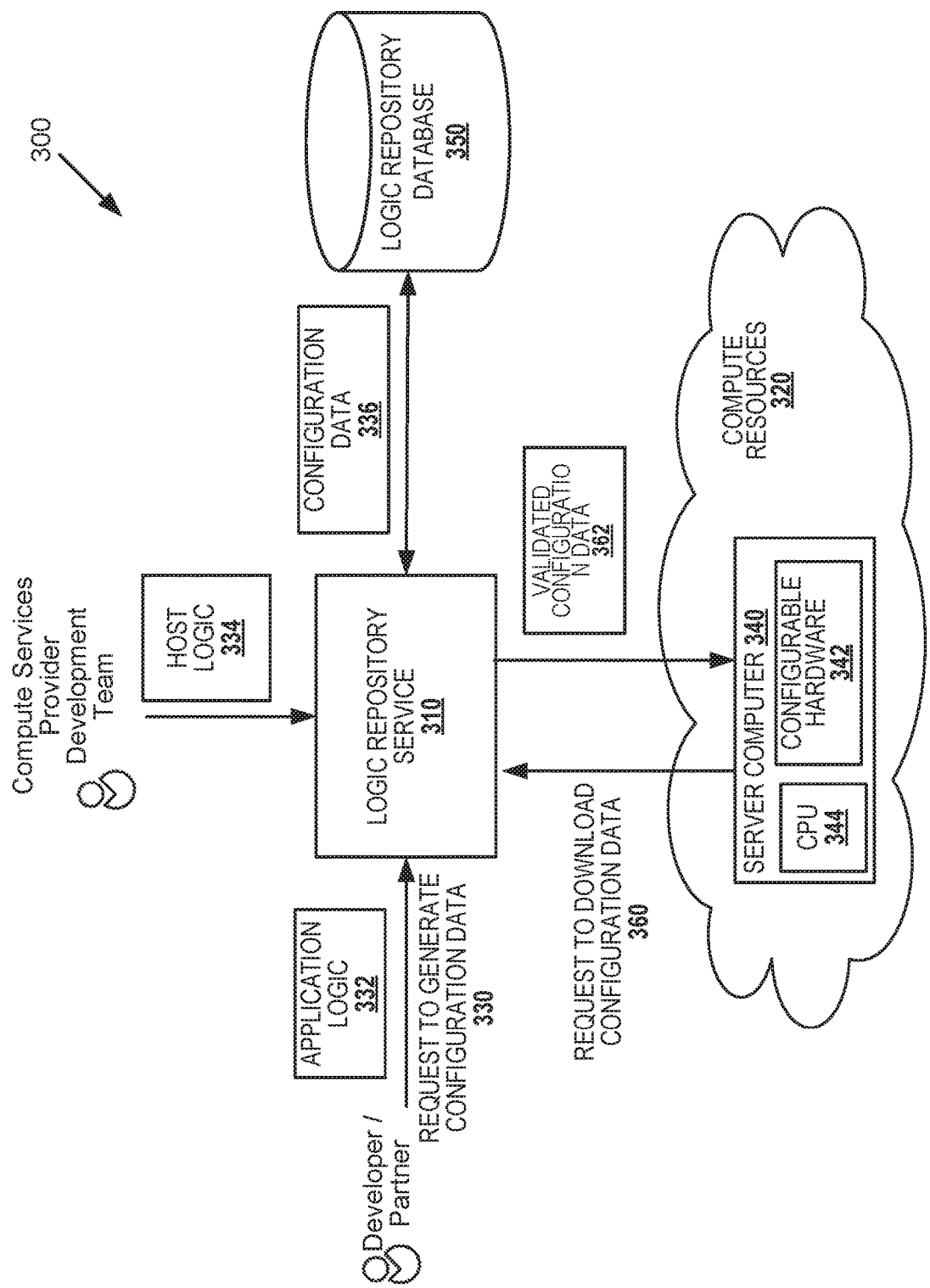
FIG. 3 is a system diagram showing an example of a system including a logic repository service for supplying configuration data to a configurable logic platform.

FIG. 3 is a system diagram showing an example of a system 300 including a logic repository service 310 for managing configuration data that can be used to configure configurable resources within a fleet of compute resources 320. A compute services provider can maintain the fleet of computing resources 320 for users of the services to deploy when a computing task is to be performed. The computing resources 320 can include server computers 340 having configurable logic resources 342 that can be programmed as hardware accelerators. The compute services provider can manage the computing resources 320 using software services to manage the configuration and operation of the configurable hardware 342. As one example, the compute service provider can execute a logic repository service 310 for ingesting application logic 332 specified by a user, generating configuration data 336 for configuring the configurable logic platform based on the logic design of the user, and downloading the validated configuration data 362 in response to a request 360 to configure an instance of the configurable logic platform. The download request 360 can be from the user that developed the application logic 332 or from a user that has acquired a license to use the application logic 332. Thus, the application logic 332 can be created by the compute services provider, a user, or a third-party separate from the user or the compute services provider. For example, a marketplace of accelerator intellectual property (IP) can be provided to the users of the compute services provider, and the users can potentially increase the speed of their applications by selecting an accelerator from the marketplace.

The logic repository service 310 can be a network-accessible service, such as a web service. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The logic repository service 310 can receive an API request 330 to generate configuration data for a configurable hardware platform, such as the configurable hardware 342 of the server computer 340. For example, the API request 330 can be originated by a developer or partner user of the compute services provider. The request 330 can include fields for specifying data and/or metadata about the logic design, the configurable hardware platform, user information, access privileges, production status, and various additional fields for describing information about the inputs, outputs, and users of the logic repository service 310. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying application logic 332 for implementation on the configurable hardware platform. Specifically, a specification of the application logic 332 and/or of the host logic 334 can be a collection of files, such as source code written in a hardware description language (HDL), a netlist generated by a logic synthesis tool, and/or placed and routed logic gates generated by a place and route tool.

The compute resources 320 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example software resources can include different operating systems, application programs, and drivers. One example instance type can comprise the server computer 340 including a central processing unit (CPU) 344 in communication with the configurable hardware 342. The configurable hardware 342 can include programmable logic such as an FPGA, a programmable logic array (PLA), a programmable array logic (PAL), a generic array logic (GAL), or a complex programmable logic device (CPLD), for example. As specific examples, an "F1.small" instance type can include a first type of server computer with one capacity unit of FPGA resources, an "F1.medium" instance type can include the first type of server computer with two capacity units of FPGA resources, an "F1.large" instance type can include the first type of server computer with eight capacity units of FPGA resources, and an "F2.large" instance type can include a second type of server computer with eight capacity units of FPGA resources.

The logic repository service 310 can generate configuration data 336 in response to receiving the API request 330. The generated configuration data 336 can be based on the application logic 332 and the host logic 334. Specifically, the generated configuration data 336 can include information that can be used to program or configure the configurable hardware 342 so that it performs the functions specified by the application logic 332 and the host logic 334. As one example, the compute services provider can generate the host logic 334 including logic for interfacing between the CPU 344 and the configurable hardware 342. Specifically, the host logic 334 can include logic for masking or shielding the application logic 332 from communicating directly with the CPU 344 so that all CPU-application logic transactions pass through the host logic 334. In this manner, the host logic 334 can potentially reduce security and availability risks that could be introduced by the application logic 332.

Generating the configuration data 336 can include performing checks and/or tests on the application logic 332, integrating the application logic 332 into a host logic 334 wrapper, synthesizing the application logic 332, and/or placing and routing the application logic 332. Checking the application logic 332 can include verifying the application logic 332 complies with one or more criteria of the compute services provider. For example, the application logic 332 can be analyzed to determine whether interface signals and/or logic functions are present for interfacing to the host logic 334. In particular, the analysis can include analyzing source code and/or running the application logic 332 against a suite of verification tests. The verification tests can be used to confirm that the application logic is compatible with the host logic. As another example, the application logic 332 can be analyzed to determine whether the application logic 332 fits within a designated region of the specified instance type. As another example, the application logic 332 can be analyzed to determine whether the application logic 332 includes any prohibited logic functions, such as ring oscillators or other potentially harmful circuits. As another example, the application logic 332 can be analyzed to determine whether the application logic 332 has any naming conflicts with the host logic 334 or any extraneous outputs that do not interface with the host logic 334. As another example, the application logic 332 can be analyzed to determine whether the application logic 332 attempts to interface to restricted inputs, outputs, or hard macros of the configurable hardware 342. If the application logic 332 passes the checks of the logic repository service 310, then the configuration data 336 can be generated. If any of the checks or tests fail, the generation of the configuration data 336 can be aborted.

Generating the configuration data 336 can include compiling and/or translating source code of the application logic 332 and the host logic 334 into data that can be used to program or configure the configurable hardware 342. For example, the logic repository service 310 can integrate the application logic 332 into a host logic 334 wrapper. Specifically, the application logic 332 can be instantiated in a system design that includes the application logic 332 and the host logic 334. The integrated system design can be synthesized, using a logic synthesis program, to create a netlist for the system design. The netlist can be placed and routed, using a place and route program, for the instance type specified for the system design. The placed and routed design can be converted to configuration data 336 which can be used to program the configurable hardware 342. For example, the configuration data 336 can be directly output from the place and route program.

As one example, the generated configuration data 336 can include a complete or partial bitstream for configuring all or a portion of the configurable logic of an FPGA. An FPGA can include configurable logic and non-configurable logic.

The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different regions which can be configured independently of one another. As one example, a full bitstream can be used to configure the configurable logic across all of the regions and a partial bitstream can be used to configure only a portion of the configurable logic regions. The non-configurable logic can include hard macros that perform a specific function within the FPGA, such as input/output blocks (e.g., serializer and deserializer (SER-DES) blocks and gigabit transceivers), analog-to-digital converters, memory control blocks, test access ports, and configuration logic for loading the configuration data onto the configurable logic.

The logic repository service 310 can store the generated configuration data 336 in a logic repository database 350. The logic repository database 350 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the logic repository service 310. Additionally, the logic repository service 310 can be used to store input files (such as the specifications for the application logic 332 and the host logic 334) and metadata about the logic designs and/or the users of the logic repository service 310. The generated configuration data 336 can be indexed by one or more properties such as a user identifier, an instance type or types, a marketplace identifier, a machine image identifier, and a configurable hardware identifier, for example.

The logic repository service 310 can receive an API request 360 to download configuration data. For example, the request 360 can be generated when a user of the compute resources 320 launches or deploys a new instance (e.g., an F1 instance) within the compute resources 320. As another example, the request 360 can be generated in response to a request from an application executing on an operating instance. The request 360 can include a reference to the source and/or destination instance, a reference to the configuration data to download (e.g., an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 350, and validated configuration data 362 (e.g. a full or partial bitstream) can be downloaded to the requesting instance (e.g., server computer 340). The validated configuration data 362 can be used to configure the configurable logic of the destination instance.

The logic repository service 310 can verify that the validated configuration data 362 can be downloaded to the requesting instance. Validation can occur at multiple different points by the logic repository service 310. For example, validation can include verifying that the application logic 332 is compatible with the host logic 334. In particular, a regression suite of tests can be executed on a simulator to verify that the host logic 334 performs as expected after the application logic 332 is added to the design. Additionally or alternatively, it can be verified that the application logic 332 is specified to reside only in reconfigurable regions that are separate from reconfigurable regions of the host logic 334. As another example, validation can include verifying that the validated configuration data 362 is compatible with the instance type to download to. As another example, validation can include verifying that the requestor is authorized to access the validated configuration data 362. If any of the validation checks fail, the logic repository service 310 can deny the request to download the validated configuration data 362. Thus, the logic repository service 310 can potentially safeguard the security and the availability of the computing resources 320 while enabling a user to customize hardware of the computing resources 320.

Figure 4:
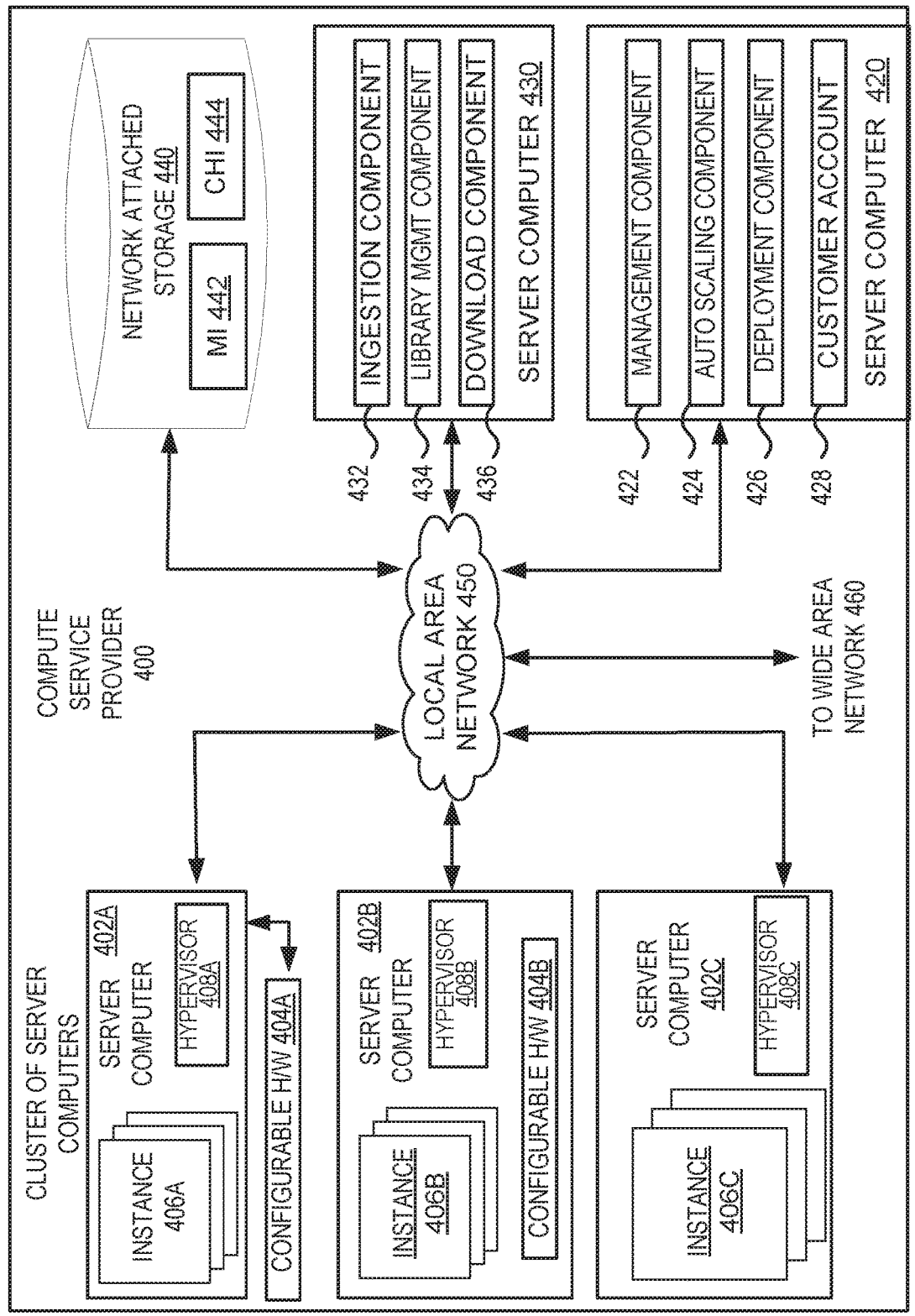
FIG. 4 is an example system diagram showing a plurality of virtual machine instances running in a multi-tenant environment including server computers having a configurable logic platform.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402C. While only three server computers are shown, any number can be used, and large centers can include thousands of server computers. The server computers 402A-402C can provide computing resources for executing software instances 406A-406C. In one embodiment, the software instances 406A-406C are virtual machines. As known in the art, a virtual machine is an instance of a software implementation of a machine (i.e. a computer) that executes applications like a physical machine. In the example of a virtual machine, each of the servers 402A-402C can be configured to execute a hypervisor 408 or another type of program configured to enable the execution of multiple software instances 406 on a single server. Additionally, each of the software instances 406 can be configured to execute one or more applications. The applications can include user or non-privileged programs, kernel or privileged programs, and/or drivers. In another embodiment (not shown), the software instances can include an operating system and application programs controlled by a single user. Thus, the computer service provider 400 can partition the resources of a given server computer among multiple customers (such as by providing a different virtual machine to each customer) and/or provide the full resources of a server computer to a single customer.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 402A-402C can include a heterogeneous collection of different hardware resources or instance types. Some of the hardware instance types can include configurable hardware that is at least partially configurable by a user of the compute service provider 400. One example of an instance type can include the server computer 402A which is in communication with configurable hardware 404A. Specifically, the server computer 402A and the configurable hardware 404A can communicate over a local interconnect such as PCIe. Another example of an instance type can include the server computer 402B and configurable hardware 404B. For example, the configurable logic 404B can be integrated within a multi-chip module or on the same die as a CPU of the server computer 402B. Yet another example of an instance type can include the server computer 402C without any configurable hardware. Thus, hardware instance types with and without configurable logic can be present within the resources of the compute service provider 400.

One or more server computers 420 can be reserved for executing software components for managing the operation of the server computers 402 and the software instances 406. For example, the server computer 420 can execute a management component 422. A customer can access the management component 422 to configure various aspects of the operation of the software instances 406 purchased by the customer. For example, the customer can purchase, rent or lease instances and make changes to the configuration of the software instances. The configuration information for each of the software instances can be stored as a machine image (MI) 442 on the network-attached storage 440. As a specific example, the MI 442 can describe the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 442 which is to be loaded on configurable hardware 404 when the instance is launched. The CHI includes configuration data for programming or configuring at least a portion of the configurable hardware 404. As another specific example, the MI 442 can describe the information used to launch an instance of an operating system directly on one of the server computers 420.

The customer can also specify settings regarding how the purchased instances are to be scaled in response to demand. The management component can further include a policy document to implement customer policies. An auto scaling component 424 can scale the instances 406 based upon rules defined by the customer. In one embodiment, the auto scaling component 424 allows a customer to specify scale-up rules for use in determining when new instances should be instantiated and scale-down rules for use in determining when existing instances should be terminated. The auto scaling component 424 can consist of a number of subcomponents executing on different server computers 402 or other computing devices. The auto scaling component 424 can monitor available computing resources over an internal management network and modify resources available based on need.

A deployment component 426 can be used to assist customers in the deployment of new instances 406 of computing resources. The deployment component can have access to account information associated with the instances, such as who is the owner of the account, credit card information, country of the owner, etc. The deployment component 426 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 426 can utilize the customer-provided configuration and cache logic to configure, prime, and launch new instances 406. For example, the deployment component 426 can be invoked when a customer launches an instance from a control console, another instance, or a marketplace page. The control console can be a web-based service that provides an interface to a customer of the compute service provider 400 so that the customer can manage his or her account and access services. As one example, the control console can enable a user to upload MIs and/or CHIs to a private catalog, and images corresponding to a particular MI or CHI can be selected by the user from the private catalog when an instance is to be deployed. The configuration, cache logic, and other information used for launching instances may be specified by a customer using the management component 422 or by providing this information directly to the deployment component 426. The instance manager can be considered part of the deployment component.

Customer account information 428 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 430 can be reserved for executing software components for managing the download of configuration data to configurable hardware 404 of the server computers 402. For example, the server computer 430 can execute a logic repository service comprising an ingestion component 432, a library management component 434, and a download component 436. The ingestion component 432 can receive host logic and application logic designs or specifications and generate configuration data that can be used to configure the configurable hardware 404. The library management component 434 can be used to manage source code, user information, and configuration data associated with the logic repository service. For example, the library management component 434 can be used to store configuration data generated from a user's design in a location specified by the user on the network-attached storage 440. In particular, the configuration data can be stored within a configurable hardware image 442 on the network-attached storage 440. Additionally, the library management component 434 can manage the versioning and storage of input files (such as the specifications for the application logic and the host logic) and metadata about the logic designs and/or the users of the logic repository service. The library management component 434 can index the generated configuration data by one or more properties such as a user identifier, an instance type, a marketplace identifier, a machine image identifier, and a configurable hardware identifier, for example. The download component 436 can be used to authenticate requests for configuration data and to transmit the configuration data to the requestor when the request is authenticated. For example, agents on the server computers 402A-B can send requests to the download component 436 when the instances 406 are launched that use the configurable hardware 404. As another example, the agents on the server computers 402A-B can send requests to the download component 436 when the instances 406 request that the configurable hardware 404 be partially reconfigured while the configurable hardware 404 is in operation.

The network-attached storage (NAS) 440 can be used to provide storage space and access to files stored on the NAS 440. For example, the NAS 440 can include one or more server computers used for processing requests using a network file sharing protocol, such as Network File System (NFS). The NAS 440 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 450.

The network 450 can be utilized to interconnect the server computers 402A-402C, the server computers 420 and 430, and the storage 440. The network 450 can be a local area network (LAN) and can be connected to a Wide Area Network (WAN) 460 so that end users can access the compute service provider 400. It should be appreciated that the network topology illustrated in FIG. 4 has been simplified and that many more networks and networking devices can be utilized to interconnect the various computing systems disclosed herein.

Figure 5:
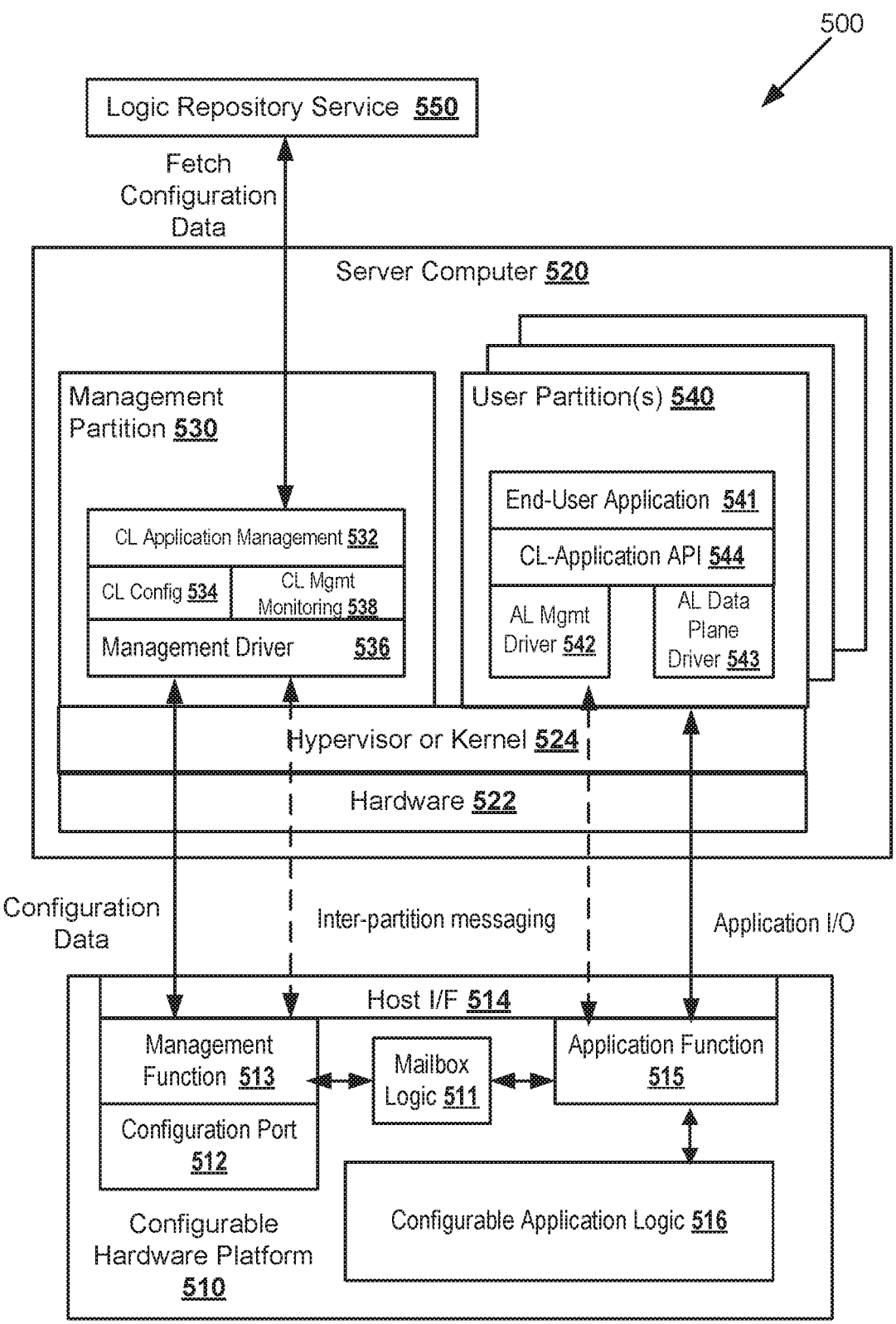
FIG. 5 shows further details of the example system of FIG. 4 including components of a control plane and a data plane for configuring and interfacing to a configurable hardware platform.

FIG. 5 shows further details of an example system 500 including components of a control plane and a data plane for configuring and interfacing to a configurable hardware platform 510. The control plane includes software and hardware functions for initializing, monitoring, reconfiguring, and tearing down the configurable hardware platform 510. The data plane includes software and hardware functions for communicating between a user's application and the configurable hardware platform 510. The control plane can be accessible by users or services having a higher privilege level and the data plane can be accessible by users or services having a lower privilege level. In one embodiment, the configurable hardware platform 510 is connected to a server computer 520 using a local interconnect, such as PCIe. In an alternative embodiment, the configurable hardware platform 510 can be integrated within the hardware of the server computer 520. As one example, the server computer 520 can be one of the plurality of server computers 402A-402B of the compute service provider 400 of FIG. 4.

The server computer 520 has underlying hardware 522 including one or more CPUs, memory, storage devices, interconnection hardware, etc. Running a layer above the hardware 522 is a hypervisor or kernel layer 524. The hypervisor or kernel layer can be classified as a type 1 or type 2 hypervisor. A type 1 hypervisor runs directly on the host hardware 522 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management partition 530 (such as Domain 0 of the Xen hypervisor) can be part of the hypervisor or separated therefrom and generally includes device drivers needed for accessing the hardware 522. User partitions 540 are logical units of isolation within the hypervisor. Each user partition 540 can be allocated its own portion of the hardware layer's memory, CPU allocation, storage, interconnect bandwidth, etc. Additionally, each user partition 540 can include a virtual machine and its own guest operating system. As such, each user partition 540 is an abstract portion of capacity designed to support its own virtual machine independent of the other partitions.

The management partition 530 can be used to perform management services for the user partitions 540 and the configurable hardware platform 510. The management partition 530 can communicate with web services (such as a deployment service, a logic repository service 550, and a health monitoring service) of the compute service provider, the user partitions 540, and the configurable hardware platform 510. The management services can include services for launching and terminating user partitions 540, and configuring, reconfiguring, and tearing down the configurable logic of the configurable hardware platform 510. As a specific example, the management partition 530 can launch a new user partition 540 in response to a request from a deployment service (such as the deployment component 426 of FIG. 4). The request can include a reference to an MI and/or a CHI. The MI can specify programs and drivers to load on the user partition 540 and the CHI can specify configuration data to load on the configurable hardware platform 510. The management partition 530 can initialize the user partition 540 based on the information associated with the MI and can cause the configuration data associated with the CHI to be loaded onto the configurable hardware platform 510. The initialization of the user partition 540 and the configurable hardware platform 510 can occur concurrently so that the time to make the instance operational can be reduced.

The management partition 530 can be used to manage programming and monitoring of the configurable hardware platform 510. By using the management partition 530 for this purpose, access to the configuration data and the configuration ports of the configurable hardware platform 510 can be restricted. Specifically, users with lower privilege levels can be restricted from directly accessing the management partition 530. Thus, the configurable logic cannot be modified without using the infrastructure of the compute services provider and any third party IP used to program the configurable logic can be protected from viewing by unauthorized users.

The management partition 530 can include a software stack for the control plane to configure and interface to a configurable hardware platform 510. The control plane software stack can include a configurable logic (CL) application management layer 532 for communicating with web services (such as the logic repository service 550 and a health monitoring service), the configurable hardware platform 510, and the user partitions 540. For example, the CL application management layer 532 can issue a request to the logic repository service 550 to fetch configuration data in response to a user partition 540 being launched. The CL application management layer 532 can communicate with the user partition 540 using shared memory of the hardware 522 or by sending and receiving inter-partition messages over the interconnect connecting the server computer 520 to the configurable hardware platform 510. Specifically, the CL application management layer 532 can read and write messages to mailbox logic 511 of the configurable hardware platform 510. The messages can include requests by an end-user application 541 to reconfigure or tear-down the configurable hardware platform 510. The CL application management layer 532 can issue a request to the logic repository service 550 to fetch configuration data in response to a request to reconfigure the configurable hardware platform 510. The CL application management layer 532 can initiate a tear-down sequence in response to a request to tear down the configurable hardware platform 510. The CL application management layer 532 can perform watchdog related activities to determine whether the communication path to the user partition 540 is functional.

The control plane software stack can include a CL configuration layer 534 for accessing the configuration port 512 (e.g., a configuration access port) of the configurable hardware platform 510 so that configuration data can be loaded onto the configurable hardware platform 510. For example, the CL configuration layer 534 can send a command or commands to the configuration port 512 to perform a full or partial configuration of the configurable hardware platform 510. The CL configuration layer 534 can send the configuration data (e.g., a bitstream) to the configuration port 512 so that the configurable logic can be programmed according to the configuration data. The configuration data can specify host logic and/or application logic.

The control plane software stack can include a management driver 536 for communicating over the physical interconnect connecting the server computer 520 to the configurable hardware platform 510. The management driver 536 can encapsulate commands, requests, responses, messages, and data originating from the management partition 530 for transmission over the physical interconnect. Additionally, the management driver 536 can de-encapsulate commands, requests, responses, messages, and data sent to the management partition 530 over the physical interconnect. Specifically, the management driver 536 can communicate with the management function 513 of the configurable hardware platform 510. For example, the management function 513 can be a physical or virtual function mapped to an address range during an enumeration of devices connected to the physical interconnect. The management driver 536 can communicate with the management function 513 by addressing transactions to the address range assigned to the management function 513.

The control plane software stack can include a CL management and monitoring layer 538. The CL management and monitoring layer 538 can monitor and analyze transactions occurring on the physical interconnect to determine the health of the configurable hardware platform 510 and/or to determine usage characteristics of the configurable hardware platform 510.

The configurable hardware platform 510 can include non-configurable hard macros and configurable logic. The hard macros can perform specific functions within the configurable hardware platform 510, such as input/output blocks (e.g., serializer and deserializer (SERDES) blocks and gigabit transceivers), analog-to-digital converters, memory control blocks, test access ports, and a configuration port 512. The configurable logic can be programmed or configured by loading configuration data onto the configurable hardware platform 510. For example, the configuration port 512 can be used for loading the configuration data. As one example, configuration data can be stored in a memory (such as a Flash memory) accessible by the configuration port 512 and the configuration data can be automatically loaded during an initialization sequence (such as during a power-on sequence) of the configurable hardware platform 510. Additionally, the configuration port 512 can be accessed using an off-chip processor or an interface within the configurable hardware platform 510.

The configurable logic can be programmed to include host logic and application logic. The host logic can shield the interfaces of at least some of the hard macros from the end-users so that the end-users have limited access to the hard macros and to the physical interconnect. For example, the host logic can include the mailbox logic 511, the configuration port 512, the management function 513, the host interface 514, and the application function 515. The end-users can cause the configurable application logic 516 to be loaded on the configurable hardware platform 510, and can communicate with the configurable application logic 516 from the user partitions 540 (via the application function 515).

The host interface logic 514 can include circuitry (e.g., hard macros and/or configurable logic) for signaling on the physical interconnect and implementing a communications protocol. The communications protocol specifies the rules and message formats for communicating over the interconnect. The application function 515 can be used to communicate with drivers of the user partitions 540. Specifically, the application function 515 can be a physical or virtual function mapped to an address range during an enumeration of devices connected to the physical interconnect. The application drivers can communicate with the application function 515 by addressing transactions to the address range assigned to the application function 515. Specifically, the application function 515 can communicate with an application logic management driver 542 to exchange commands, requests, responses, messages, and data over the control plane. The application function 515 can communicate with an application logic data plane driver 543 to exchange commands, requests, responses, messages, and data over the data plane.

The mailbox logic 511 can include one or more buffers and one or more control registers. For example, a given control register can be associated with a particular buffer and the register can be used as a semaphore to synchronize between the management partition 530 and the user partition 540. As a specific example, if a partition can modify a value of the control register, the partition can write to the buffer. The buffer and the control register can be accessible from both the management function 513 and the application function 515. When the message is written to the buffer, another control register (e.g., the message ready register) can be written to indicate the message is complete. The message ready register can be polled by the partitions to determine if a message is present, or an interrupt can be generated and transmitted to the partitions in response to the message ready register being written.

The user partition 540 can include a software stack for interfacing an end-user application 541 to the configurable hardware platform 510. The application software stack can include functions for communicating with the control plane and the data plane. Specifically, the application software stack can include a CL-Application API 544 for providing the end-user application 541 with access to the configurable hardware platform 510. The CL-Application API 544 can include a library of methods or functions for communicating with the configurable hardware platform 510 and the management partition 530. For example, the end-user application 541 can send a command or data to the configurable application logic 516 by using an API of the CL-Application API 544. In particular, the API of the CL-Application API 544 can interface with the application logic (AL) data plane driver 543 which can generate a transaction targeted to the application function 515 which can communicate with the configurable application logic 516. In this manner, the end-user application 541 can cause the configurable application logic 516 receive, process, and/or respond with data to potentially accelerate tasks of the end-user application 541. As another example, the end-user application 541 can send a command or data to the management partition 530 by using an API of the CL-Application API 544. In particular, the API of the CL-Application API 544 can interface with the AL management driver 542 which can generate a transaction targeted to the application function 515 which can communicate with the mailbox logic 511. In this manner, the end-user application 541 can cause the management partition 530 to provide operational or metadata about the configurable hardware platform 510 and/or to request that the configurable application logic 516 be reconfigured.

The application software stack in conjunction with the hypervisor or kernel 524 can be used to limit the operations available to perform over the physical interconnect by the end-user application 541. For example, the compute services provider can provide the AL management driver 542, the AL data plane driver 543, and the CL-Application API 544 (such as by associating the files with a machine image). These components can be protected from modification by only permitting users and services having a higher privilege level than the end-user to write to the files. The AL management driver 542 and the AL data plane driver 543 can be restricted to using only addresses within the address range of the application function 515. Additionally, an input/output memory management unit (I/O MMU) can restrict interconnect transactions to be within the address ranges of the application function 515 or the management function 513.

Figure 6:
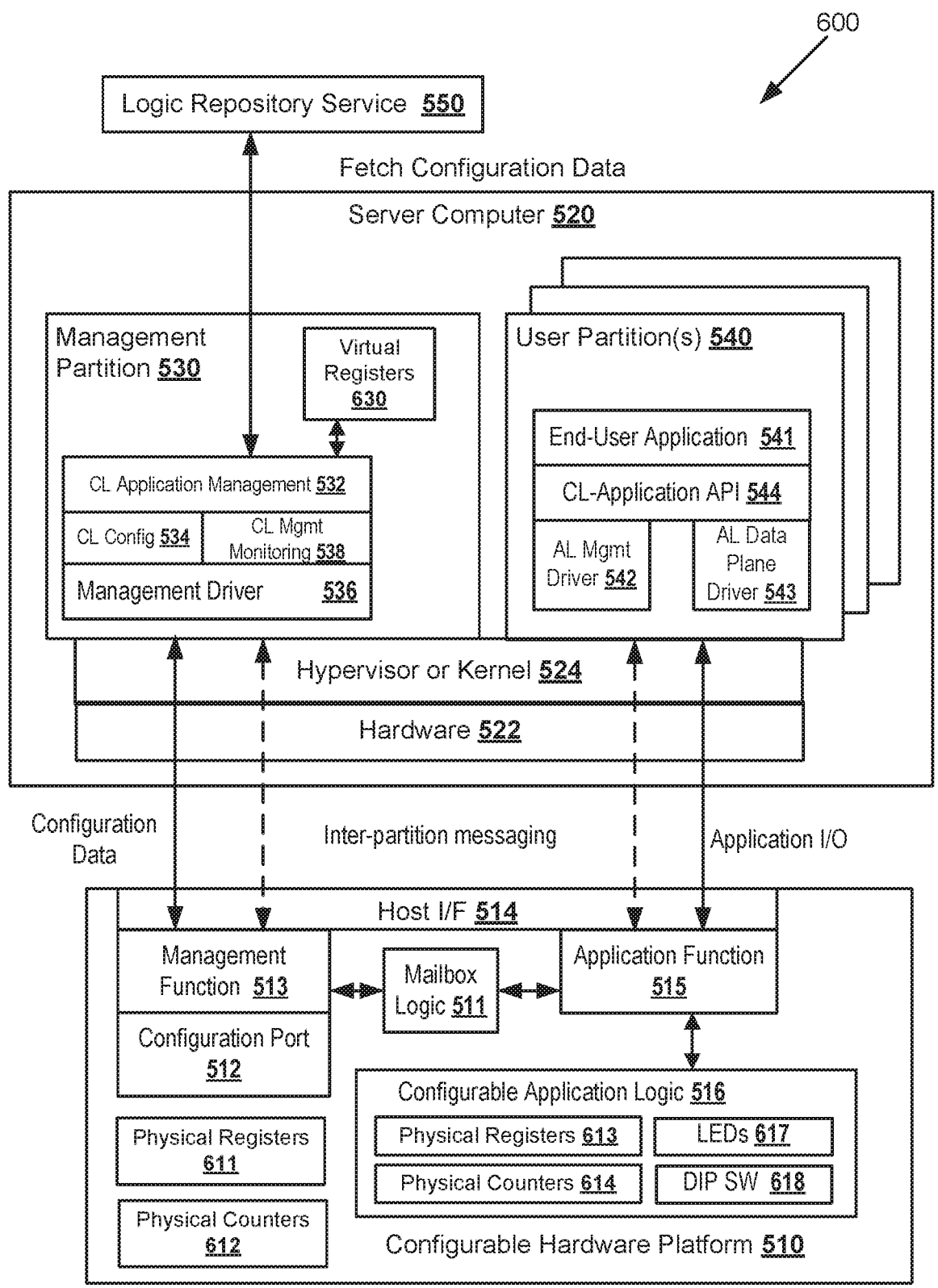
FIG. 6 is a simplified block diagram illustrating a computing system according to an example embodiment.

FIG. 6 is a simplified block diagram illustrating a computing system according to an example embodiment. A computing system 600 in FIG. 6, similar to system 500 of FIG. 5, includes a server computer 520 and a configurable hardware platform 510. Server computer 520 can include a management partition 530 and user partitions 540. Similar to system 500 in FIG. 5, computing system 600 is configured to provide user partitions 540 with physical or virtual access to part of the configurable hardware platform 510 through a shell or host logic in the configurable hardware platform. Computing system 600 is also configured to provide user partition 540 with virtual access to certain portions/resources associated with the configurable hardware platform 510. In one embodiment, virtual access may refer to access from the user partition 540, wherein the user partition 540 perceives the access to be directed to a hardware resource in the configurable hardware platform 510. Instead, the access is rerouted (using mailbox logic 511 by the host/shell logic) to the management partition 530 for further processing. The management partition 530 may validate the access and may additionally either perform (or actuate such a performance) the access to the configurable hardware platform 510 on behalf of the user partition 540 or respond to the user partition 540 with the requested information with or without accessing the underlying component of the configurable hardware platform 510 that the virtual access was directed towards. In this manner, the virtual access may be configured to allow the user access to control and status signals of the configurable hardware platform 510 from within the instance of user partition 540, while continuing to protect configurable hardware platform 510 from malicious and/or errant use.

Computing system 600 has many components in common with system 500 in FIG. 5, and the functions of these common components are not repeated here for simplicity. However, additional details are described below.

In FIG. 6, configurable hardware platform 510 is coupled to server computer 520. As described above, server computer 520 can include a management partition 530 and one or more user partitions 540. An example of a management partition is Domain 0 of the Xen hypervisor (Dom0), and an example of a user partition is Domain U of the Xen hypervisor (DomU).

Configurable hardware platform 510 can include a shell or host logic (HL) and a configurable application logic or customer logic (CL). It is noted that, in the context of the embodiments described here, the terms "shell" and "host logic" may be used interchangeably with the term "control plane," and the terms "application logic" and "customer logic" may be used interchangeably with the term "data plane." As described above in connection with FIGS. 1, 2, and 5, the functions of the configurable hardware platform 210 or 510 can be divided or categorized based upon the purpose or capabilities of the functions. For example, the functions can be categorized as control plane functions, data plane functions, and shared functions. A control plane can be used for management and configuration of the configurable hardware platform 510. The data plane can be used to manage data transfer between accelerator logic loaded onto the configurable hardware platform 510 and the server computer 520. Shared functions can be used by both the control plane and the data plane. The data plane can include encapsulated reconfigurable logic configured with application logic 516. The control plane can include host logic of the configurable hardware platform 510.

In some embodiments, a first part of configurable hardware platform 510 can include privileged signals, and a second part of the configurable hardware platform 510 can include less privileged signals. The user partition 540 can have physical or direct access to the less privileged signals. On the other hand, the user partition 540 can have only virtual access to the more privileged signals, which can include control and status signals, metrics, and counters, etc. To access these more privileged signals, the user partition 540 can send a request to the management partition 530 for an action through the mailbox logic 511 in configurable hardware platform 510, which provides a communication path bypassing messages between management partition 530 and user partition 540. In some cases, the user partition 540 may be unaware of the virtualized handling of the request and merely sends the request for access to the privileged signals or resources to the configurable hardware platform 510, and the management function 513 in the configurable hardware platform 510 detects that the request is to a privileged signal or resource and reroutes the access to the management partition 530. Upon receiving the request, management partition 530 can perform the action and return a result of the action through mailbox logic 511 to user partition 540.

In some embodiments, configurable hardware platform 510 can have physical registers 611 and 613 and physical counters 612 and 614 that are associated with various control and status signals. Depending on their functionalities, physical registers 613 and physical counters 614 can reside in configurable application logic 516, and physical registers 611 and physical counters 612 can reside outside configurable application logic 516. Management partition 530 is configured to provide, to the user partition 540, virtual control signals and virtual status signals and virtual counters associated with the virtual control signals and virtual status signals. In order to provide virtual access to the various control and status signals, management partition 530 can have virtual registers 630 to keep track of the values of the registers in configurable hardware platform 510. In one embodiment, use of such virtual registers may refer to maintaining a representation of the physical registers or resources in the management partition 530, such that an altered/virtual view of the physical signals/resources can be presented to the user partition 540.

As an example, upon receiving a request from user partition 540 to reset a counter, management partition 530 can reset the virtual counter value in a virtual register 630 associated with the physical counter 612 or 614, and take a snapshot value of the physical counter register 612 or 614. Thereafter, upon receiving a request from user partition 540 for the value of the counter, management partition 530 can report a virtual counter value that is equal to a difference between a current value of the physical counter register 612 or 614 and the snapshot value stored in the corresponding virtual register 630. Depending on the function, the counter register can be configured to count occurrences of a predetermined event to count elapsed time.

In some embodiments, the configurable hardware platform is configured to receive a first command from the user partition and process the first command using the configurable application logic, wherein the processing of the first command using the configurable application logic is managed by the host logic. The configurable hardware platform is also configured to receive a second command for the configurable application logic from the user partition and forward the second command to the management partition for processing. A computing system can be configured to provide a user's virtual machine with virtual access to certain portions/resources associated with the configurable hardware platform, e.g., FPGA. In a virtual access, the user partition perceives the access to be directed to a hardware resource in the FPGA. Instead, the access is rerouted to the management partition or the host logic in the FPGA for further processing, depending on the desired level of control and security. In this manner, the virtual access allows the user to access control and status signals of the FPGA from within the instance of user partition, while continuing to protect configurable hardware platform from malicious and/or errant uses.

In an embodiment, the management can be done by configuring the system such that the configurable hardware platform can access certain resources and perform related processing directly or implementing a mask that allows access to certain resources/processing and disables access/processing to certain other resources. For example, an access register can have multiple bits associated with corresponding resources, and the mask having 1 or 0 at each bit location can be used to select allowed resources.

In an embodiment, the first command has a lower privilege than the second command. Commands having lower privileges can be processed by the configurable application logic, which provides a response to the user partition. The commands having higher privileges can be processed by the management partition, which provides a response to the user partition via the host logic (HL) of the configurable hardware platform. In this embodiment, the virtual access allows the user to access control and status signals of the configurable hardware platform from within the instance of user partition, while continuing to protect configurable hardware platform from malicious and/or errant uses. In some embodiments, the first command may be directed to a first portion of the configurable application logic configured to be accessible to the user partition, and the second command may be directed to a second portion of the configurable application logic configured to be accessible only to the management partition.

In some embodiments, management partition 530 is configured to provide to user partition 540 a virtual LED (light-emitting diode) function corresponding to LEDs 617 in configurable hardware platform 510. In other embodiments, the virtual LED function can be handled by the configurable hardware platform 510. In the latter case, the virtual register representing an LED can reside in the configurable application logic 516 or in the host logic of the configurable hardware platform 510. For example, user partition 540 can issue a command to request for the current status of a virtual LED, and this request can be handled by the management partition 530 or the host logic of the configurable hardware platform 510. The virtual LED can be represented by a bit-map representing the state (I/O) of the virtual LEDs exposed by the configurable logic or custom Logic (CL) 516. In an embodiment, a bit stream of zeros (0) and ones (1) can represent the on/off status of a number of LEDs. For example, a bit-map of 0000-0000-0000-0000 can represent locations of 16 virtual LEDs. As another example, a bit map with a return value 0000000001000000 having the sixth bit set to one (1) can indicate that the sixth (6) virtual LED is set or on.

Although various embodiments described herein refer to "LEDs" or "virtual LEDs", it should be understood that further embodiments can use other visual indicators (e.g., LCDs, e-ink displays) in place of the physical LEDs, as well as corresponding virtual visual indicators in place of the virtual LEDs.

In some embodiments, management partition 530 is configured to provide to user partition 540 a virtual DIP switch. In other embodiments, the virtual DIP switch function can be handled by the configurable hardware platform 510. In the latter case, the virtual register representing a DIP switch can reside in the configurable application logic 516 or in the host logic of the configurable hardware platform 510. For example, user partition 540 can issue a command to request for the current status of a virtual DIP switch, and this request can be handled by the management partition 530 or the host logic of the configurable hardware platform 510. The virtual DIP switch can be represented by a bit-map representing the state (I/O) of the virtual DIP switches exposed by the configurable logic or custom Logic (CL) 516. In an embodiment, a bit stream of zeros (0) and ones (1) can represent the on/off status of a number of DIP switches. For example, a bit-map of 0000-1101-0111-1000 can represent locations of 16 virtual DIP switches. As another example, a bit map with a return value 0000000001000000 having the sixth bit set to one (1) can indicate that the sixth (6) virtual DIP switch is set or on.

In another example, user partition 540 can issue a command with a bit-map to request for setting the selected DIP switches, and the management partition 530 or the host logic in the configurable hardware platform 510 can set the virtual DIP switches according to the bit-map included in the command from user partition 540. For example, a bit-map of 0101000011000000 can cause virtual DIP switches #6, #7, #12, and #14 to be set. In addition, user partition 540 can issue a command to identify the existence of DIP switches, and a bit-map of 0000-1101-0111-1000 can represent the presence of DIP switches in slot numbers 11, 10, 8, 6, 5, 4, and 3.

Although various embodiments described herein refer to "DIP switches" or "virtual DIP switches", it should be understood that further embodiments can use other physical mechanisms (e.g., jumper pins) in place of the physical DIP switches, as well as corresponding virtual mechanisms in place of the virtual DIP switches.

In some embodiments, management partition 530 is configured to provide user partition 540 capabilities to monitor and operate virtual local metrics signals, such as virtual control and status signals. In other embodiments, the virtual local metrics signals can be handled by the configurable hardware platform 510. In the latter case, the virtual register representing a virtual local metrics signal can reside in the configurable application logic 516 or in the host logic of the configurable hardware platform 510. For example, user partition 540 can issue a command to request for the current status of metrics signals, such as status signals, error address and count, DDR memory read/write counters, etc. User partition 540 can also issue a command to request for clearing the metrics signals.

With respect to counters, management partition 530 or the configurable hardware platform 510 can be configured to provide to the user partition 540 a virtual counter value based on a counter register in configurable hardware platform 510. Within configurable hardware platform 510, a global value of the counter register continues to be triggered by a selected event or elapsed time for operational metrics. Management partition 530 or the configurable hardware platform 510 is configured to allow user partition 540 to clear a local view of the counter. Management partition 530 or the configurable hardware platform 510 can take a snapshot of the current counter values at well-defined points in time and then return a delta for the customer metrics. For example, this can be determined by a subtraction operation to determine the difference between the current global value of the counter and the previous snapshot value. Further, a "clear metrics" command returns the current delta values and records a new snapshot, so the next "metrics" request will return a new delta. For example, the new delta can be 0, if the counter value has not changed since the previous "clear metrics" command.

The virtual status signals and counters can include various timeouts (debug link, PCIe interface, ports, etc.), errors, accesses to memory, etc. The virtual status signals and counters can also include counters for various timeout events, error events, counts of memory read or write accesses, etc.

In the embodiments describe above, the virtual access is provided by the management partition 530. In these cases, virtual registers 630 in the management partition 530 can be used to allow user partition 540 to communicate with management partition 530 to query status or metrics of various resources in the configurable hardware platform.

In some embodiments, virtual access can be provided by configurable hardware platform 510, either in the host logic or the configurable application logic. For example, virtual LEDs, DIP switches, and various metrics and counters can be represented by registers in the host logic or the configurable application logic in configurable hardware platform 510. For example, user partition 540 can access these virtual devices or registers through a path that includes application management driver 542 in user partition 540, application function in 515 in configurable hardware platform 510, and management function 513 in configurable hardware platform 510.

Various resources, such as counters and registers, etc., in the configurable hardware platform 510 can be exposed to user partition 540. Other resources can only be accessed by user partition 540 through management partition 530. In some embodiments, BAR (Base Address Register) and/or MMIO (Memory Mapped Input Output) can be used to manage these functions. In some embodiments, access to virtual LEDs and DIP SW do not need to go through the management partition 530. In an embodiment, the user partition 540 can use AL management driver 542 to access the management function driver 513 in configurable hardware platform 510. In some embodiments, virtual LEDs and DIP switches may not have physical counterparts. In these cases, the virtual LEDs and DIP can be represented by registers to allow the user to see the status of the virtual LEDs and DIP switches and allow the user to control the hardware in configuration application logic 516.

The virtual access described above can be implemented using hardware to keep copies of virtualized counters and registers for user to access. Depending on the embodiment, these copies can be kept in the registers in the management partition 530 or the configurable hardware platform 510.

In some embodiments, for different resources, the virtualized counters or registers may reside in the host logic of configurable hardware platform 510. The features being accessed may reside in the host logic or custom logic, for example, memory status and counters, LEDs, clocks, and various metrics. In some embodiments, these features can be enable or disabled, for example using memory mapped I/O space.

Figure 7:
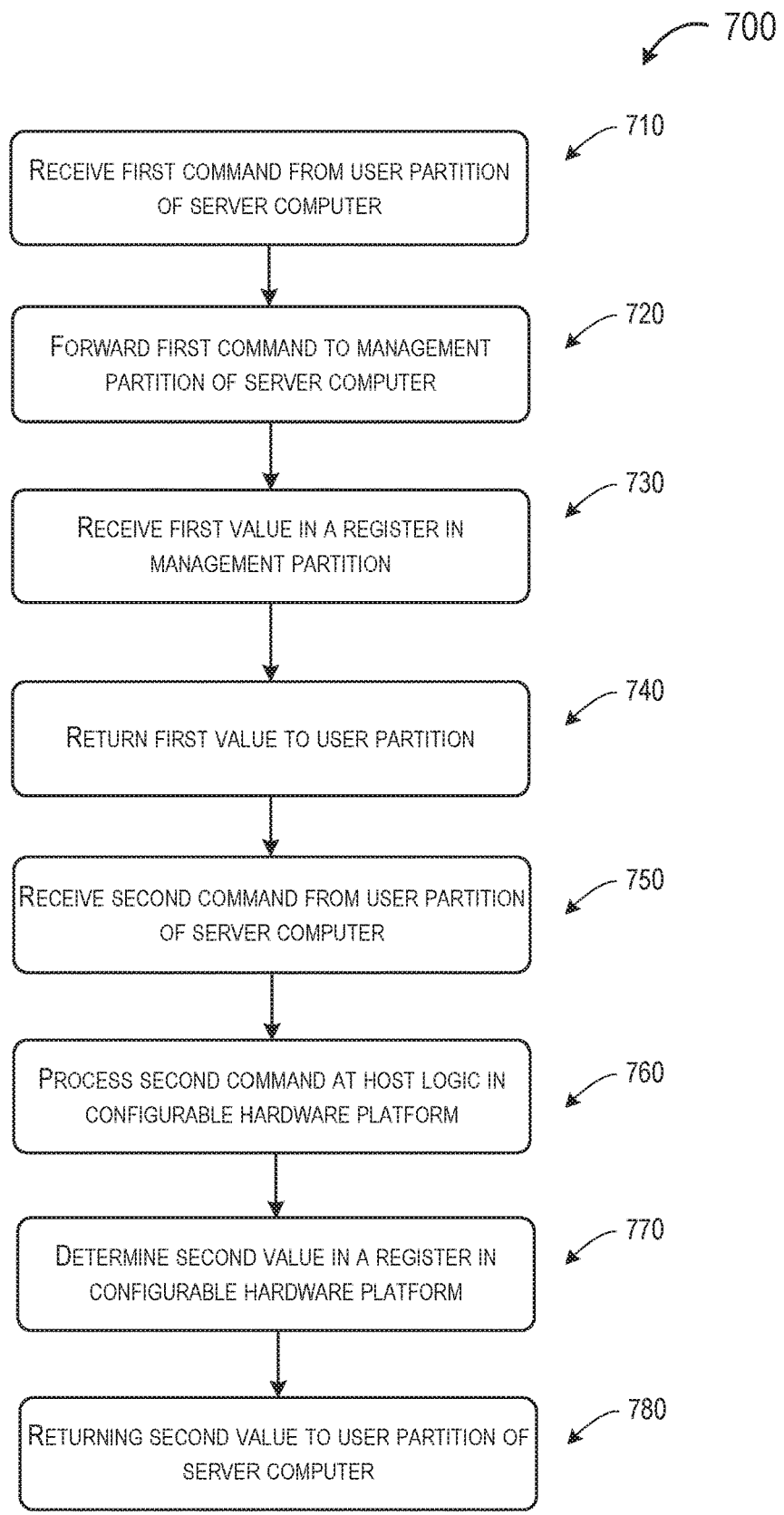
FIG. 7 is a flowchart illustrating a method of virtualization of status and control signals in a configurable hardware platform according to some embodiments.

FIG. 7 is a flowchart illustrating a method of virtualization of status and control signals in a configurable hardware platform according to some embodiments. Method 700 illustrated in FIG. 7 can be implemented in a computing system, e.g., computing system 600 of FIG. 6. As described above, computing system 600 has a server computer 520 and a configurable hardware platform 510. The server computer 520 can include virtual machines, such as a management partition (530) and a user partition (540). The configurable hardware platform 510 includes a configurable application logic (516) and a host logic. The host logic can be used to encapsulate the reconfigurable logic region 516. In FIG. 6, the host logic (HL), also referred to as shell, can include a host interface 514, a management function 513, an application function 515, a configuration port 512, and a mailbox logic 511. Virtualization of control and status signals of the configurable hardware platform 510 can be provided using registers to store values that represent virtual hardware components or values based on physical hardware components. Examples of virtual hardware components include the virtual LEDs 617 and virtual DIP switches 618 that do not have physical counterparts, as described above in connection with FIG. 6. Virtual registers can also be used to provide signal values based on physical hardware components, such as counters, status registers, and other metrics. Depending on the embodiments, the registers for presenting virtual signal values, also referred to here as virtual registers, can reside in the management partition (530) of the server computer. These virtual registers can also reside in the configurable hardware platform 510, either in the host logic or the configurable application logic 516. In some embodiments, a BAR (Base Address Register) and/or a MMIO (Memory Mapped Input Output) can be used to manage these functions.

In a first scenario, the virtual registers reside in the management partition 530 of the server computer. As shown in FIG. 7, method 700 includes receiving, from a user partition in the server computer, a first command to request for a first status or control signal in the configurable hardware platform (710). For example, the user partition 540 can use AL management driver 542 or AL data plane driver 543 to access the management function driver 513 or the application function 515 in the configurable hardware platform 510. Next, the configurable hardware platform 510 can forward the first command to a management partition in the server computer for processing (720). Thus, the user partition 540 can send a request to the management partition 530 for an action through the mailbox logic 511 in configurable hardware platform 510, which provides a communication path bypassing messages between management partition 530 and user partition 540. Upon receiving the request, management partition 530 can perform the action. A virtual register 630 in the management partition 630 can be used to hold the value of the requested first status or control signal. Alternatively, the value can be computed based on the current and previous contents of the register. At 730, the configurable hardware platform receives from the management partition 530, a first value in a register in the management partition. At 740, the configurable hardware platform 510 returning the first value to the user partition 540 in the server computer. For example, the value can be returned to user partition 540 through mailbox logic 511 in the configurable hardware platform 510. In some cases, the communication may not be carried out through the mailbox. For example, the configurable hardware platform can be configured to use networking supported by an Application Programming Interface (API) for communication between the management partition and the user partition.

In a second scenario, the virtual registers reside in configurable hardware platform 510, either in the host logic or in the configurable application logic. As shown in FIG. 7, at 750, the configurable hardware platform 510 receives a second command from the user partition in the server computer. The second command can be a request for a second status or control signal that may be held in a virtual register in in the configurable hardware platform 510. At this point, the configurable hardware platform 510 processes the second command at the host logic in the configurable hardware platform (760). Next, at 770 the configurable hardware platform 510 determines a second value in a register in the configurable hardware platform 510. The value of the virtual register represents the second status or control signal in the configurable hardware platform. The virtual register in the configurable hardware platform can be disposed in the host logic of the configurable hardware platform 510. Alternatively, the virtual register in the configurable hardware platform can be disposed in the configurable application logic 516 of the configurable hardware platform 510. After determining the value of the status or control signal, the configurable hardware platform 510 returns the first value to the user partition 540 in the server computer. For example, the value can be sent to the user partition 540 from management function 513, through mailbox logic 511 and application function 514 in the configurable hardware platform 510, to the AL management driver 542.

Figure 8:
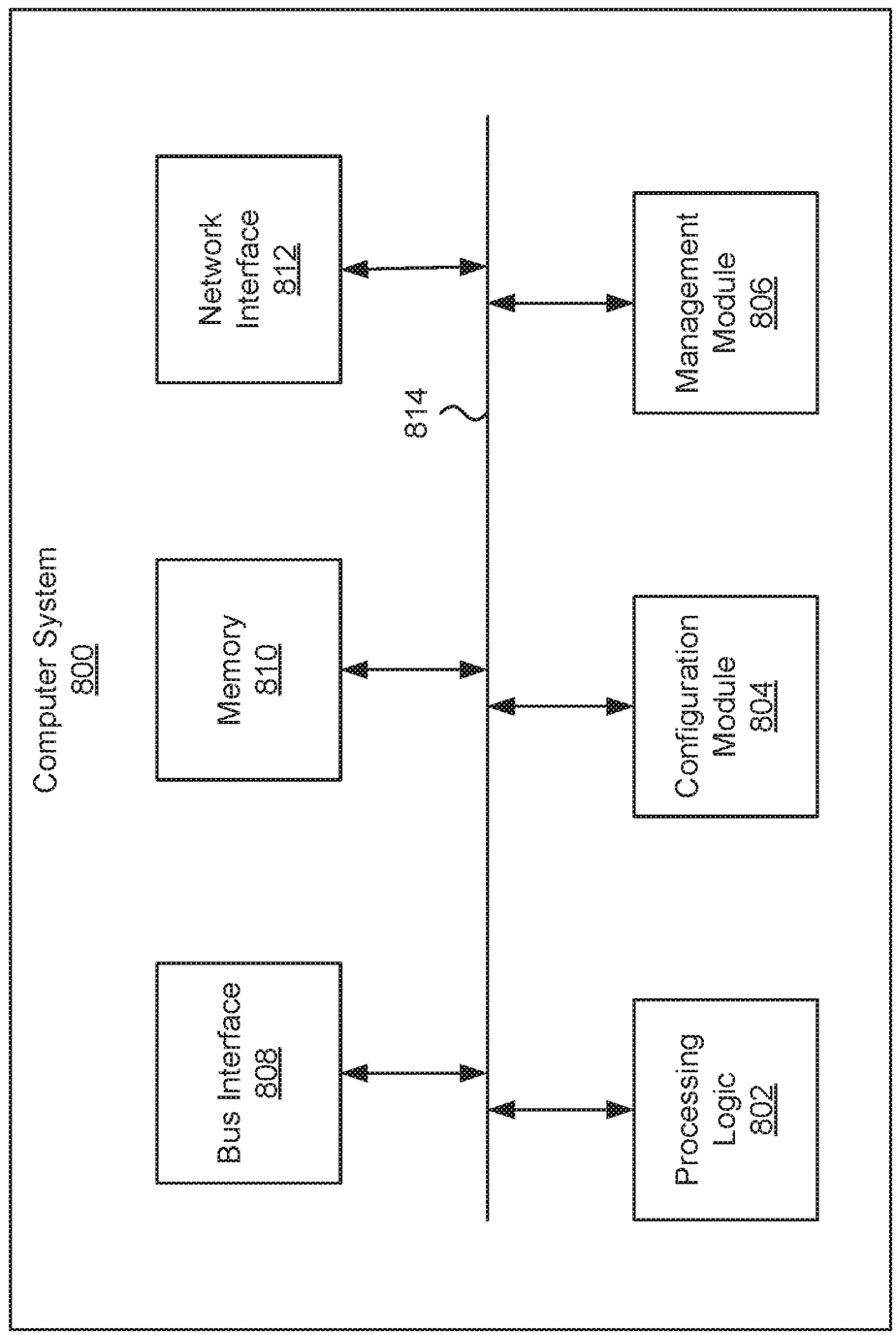
FIG. 8 illustrates an example of a computer systems.

FIG. 8 illustrates an example of a computer system 800. Functionality and/or several components of the computer system 800 may be used without limitation with other embodiments disclosed elsewhere in this disclosure, without limitations. A computer system 800 may facilitate processing of packets and/or forwarding of packets from the computer system 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer system 800 may be the recipient and/or generator of packets. In some implementations, the computer system 800 may modify the contents of the packet before forwarding the packet to another device. The computer system 800 may be a peripheral device coupled to another computer device, a switch, a router or any other suitable device enabled for receiving and forwarding packets.

In one example, the computer system 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computer system 800 may include additional modules, not illustrated here, such as components discussed with respect to the nodes disclosed in FIG. 8. In some implementations, the computer system 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computer system 800, while in other cases some or all of the memory may be external to the computer system 800. The memory 810 may store an operating system comprising executable instructions that, when executed by the processing logic 802, provides the execution environment for executing instructions providing networking functionality for the computer system 800. The memory may also store and maintain several data structures and routing tables for facilitating the functionality of the computer system 800.

In some implementations, the configuration module 804 may include one or more configuration registers. Configuration registers may control the operations of the computer system 800. In some implementations, one or more bits in the configuration register can represent certain capabilities of the computer system 800. Configuration registers may be programmed by instructions executing in the processing logic 802, and/or by an external entity, such as a host device, an operating system executing on a host device, and/or a remote device. The configuration module 804 may further include hardware and/or software that control the operations of the computer system 800.

In some implementations, the management module 806 may be configured to manage different components of the computer system 800. In some cases, the management module 806 may configure one or more bits in one or more configuration registers at power up, to enable or disable certain capabilities of the computer system 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computer system 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 800 may include multiple network interface modules, each configured to communicate with a different network. For example, in these implementations, the computer system 800 may include a network interface module for communicating with a wired Ethernet network, a wireless 802.11 network, a cellular network, an Infiniband network, etc.

The various components and modules of the computer system 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
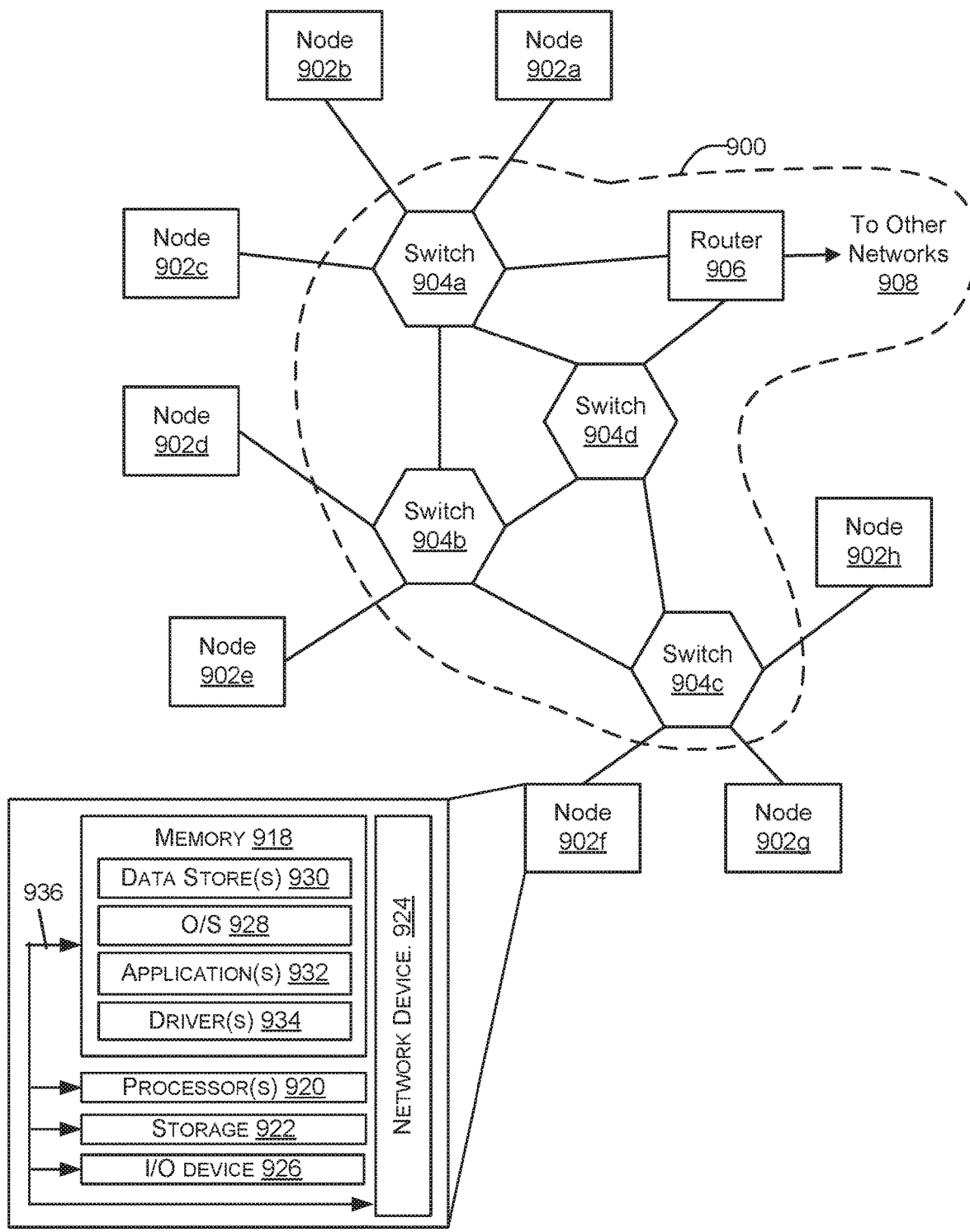
FIG. 9 illustrates a network, including various different types of computer systems of FIG. 8, such as nodes, switches, and routers.

FIG. 9 illustrates a network 900, including various different types of the computer system of FIG. 8, such as nodes, switches, and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A computer system 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more computer systems 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the computer system 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 908 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system, comprising:
   a server computer, comprising a management partition and a user partition; and
   a configurable hardware platform coupled to the server computer, the configurable hardware platform comprising a field-programmable gate array (FPGA) including a host logic and a configurable application logic, the host logic encapsulating the configurable application logic;
   wherein the configurable hardware platform comprises a mailbox logic configured to pass messages between the management partition and the user partition;
   wherein the computing system is configured to provide the user partition with physical or direct access to a first part of the configurable hardware platform through the host logic in the configurable hardware platform; and
   wherein the computing system is configured to provide the user partition with only virtual access to a second part of the configurable hardware platform through the management partition;
   wherein providing the user partition with virtual access to the second part of the configurable hardware platform comprises:
   the user partition sending a request for an action through the mailbox logic to the management partition;
   the management partition performing the action; and
   the management partition returning a result of the action through the mailbox logic to the user partition.

2. The computing system of claim 1, wherein the host logic is configured to provide virtual access to resources in the host logic and configurable application logic.

3. The computing system of claim 1, wherein the configurable application logic is configured to provide direct or virtual access to resources in the configurable application logic.

4. The computing system of claim 1, wherein the second part of the configurable hardware platform comprises control and status signals, metrics, or counters.

5. The computing system of claim 1, wherein the management partition is configured to provide, to the user partition, a virtual counter value based on a counter register in the configurable hardware platform by:
   upon receiving a user request for counter reset, resetting the virtual counter value and taking a snapshot value of the counter register; and
   upon receiving a user request for counter value, reporting a virtual counter value that is equal to a difference between a current value of the counter register and the snapshot value.

6. The computing system of claim 5, wherein the counter register is configured to count occurrences of a pre-determined event.

7. The computing system of claim 5, wherein the counter register is configured to count an elapsed time.

8. The computing system of claim 1, wherein the configurable hardware platform is configured to provide to the user partition a virtual DIP-switch function as part of the virtual access to the second part of the configurable hardware platform.

9. The computing system of claim 1, wherein the configurable hardware platform is configured to provide to the user partition a virtual LED function as part of the virtual access to the second part of the configurable hardware platform.

10. A computing system, comprising:
a server computer, comprising a management partition and a user partition; and
a configurable hardware platform coupled to the server computer, the configurable hardware platform including a host logic and a configurable application logic, the host logic encapsulating the configurable application logic;
wherein the computing system is configured to provide the user partition with physical or virtual access to a first part of the configurable hardware platform through the host logic in the configurable hardware platform; and
wherein the computing system is configured to provide the user partition with virtual access to a second part of the configurable hardware platform through the management partition;
wherein the management partition is configured to provide, to the user partition, a virtual counter value based on a counter register in the configurable hardware platform by:
upon receiving a user request for counter reset, resetting the virtual counter value and taking a snapshot value of the counter register; and
upon receiving a user request for counter value, reporting a virtual counter value that is equal to a difference between a current value of the counter register and the snapshot value.

11. The computing system of claim 10, wherein the counter register is configured to count occurrences of a pre-determined event.

12. The computing system of claim 10, wherein the counter register is configured to count an elapsed time.

13. The computing system of claim 10, wherein the configurable application logic is configured to provide direct or virtual access to resources in the configurable application logic.

14. A method, comprising:
receiving, from a user partition in a server computer, a first command requesting for resources in a configurable hardware platform coupled to the server computer, the configurable hardware platform comprising a field-programmable gate array (FPGA) including a host logic and a configurable application logic, the server computer further comprising a management partition;
providing the user partition with physical or direct access to a first part of the configurable hardware platform through the host logic in the configurable hardware platform; and
providing the user partition with only virtual access to a second part of the configurable hardware platform through the management partition;
wherein providing the user partition with virtual access to the second part of the configurable hardware platform comprises:
the user partition sending a request for an action through a mailbox logic to the management partition, the mailbox logic configured to pass messages between the management partition and the user partition;
the management partition performing the action; and
the management partition returning a result of the action through the mailbox logic to the user partition.

15. The method of claim 14, wherein the configurable application logic is configured to provide direct or virtual access to resources in the configurable application logic.

16. The method of claim 14, wherein the second part of the configurable hardware platform comprises control and status signals, metrics, or counters.

* * * * *